United States Patent
Randolph

(10) Patent No.: US 10,157,433 B2
(45) Date of Patent: Dec. 18, 2018

(54) SYSTEMS AND METHODS FOR IMPROVED PROPERTY INSPECTION MANAGEMENT

(71) Applicant: UScope Technologies, Inc., Atlanta, GA (US)

(72) Inventor: Earl Randolph, Atlanta, GA (US)

(*) Notice: Subject to any disclaimer, the term of this patent is extended or adjusted under 35 U.S.C. 154(b) by 0 days.

(21) Appl. No.: 15/721,715

(22) Filed: Sep. 29, 2017

(65) Prior Publication Data
US 2018/0025451 A1 Jan. 25, 2018

Related U.S. Application Data

(63) Continuation-in-part of application No. 15/376,637, filed on Dec. 12, 2016, which is a continuation-in-part of application No. 14/883,620, filed on Oct. 15, 2015, now Pat. No. 9,519,734.

(60) Provisional application No. 62/177,020, filed on Oct. 15, 2014.

(51) Int. Cl.
| | |
|---|---|
| *G06F 3/0482* | (2013.01) |
| *G06Q 50/16* | (2012.01) |
| *G06F 3/16* | (2006.01) |
| *G06Q 40/08* | (2012.01) |
| *G06F 17/50* | (2006.01) |
| *G06F 3/0481* | (2013.01) |
| *G06F 3/0488* | (2013.01) |
| *G06T 11/20* | (2006.01) |
| *G10L 15/26* | (2006.01) |

(52) U.S. Cl.
CPC ......... *G06Q 50/163* (2013.01); *G06F 3/0481* (2013.01); *G06F 3/0482* (2013.01); *G06F 3/0488* (2013.01); *G06F 3/04883* (2013.01); *G06F 3/167* (2013.01); *G06F 17/5004* (2013.01); *G06Q 40/08* (2013.01); *G06Q 50/16* (2013.01); *G06T 11/206* (2013.01); *G10L 15/26* (2013.01); *G06T 2210/04* (2013.01); *H04M 2250/22* (2013.01)

(58) Field of Classification Search
CPC .. G06F 3/0482; G06F 3/04883; G06F 3/0481; G06F 3/0488; G06F 3/167; G06F 17/5004; H04M 2250/22; G06Q 50/163; G06Q 40/08
See application file for complete search history.

(56) References Cited

U.S. PATENT DOCUMENTS

| | | | | |
|---|---|---|---|---|
| 8,428,453 | B1* | 4/2013 | Spiegel | H04N 5/23216 |
| | | | | 396/299 |
| 8,712,893 | B1* | 4/2014 | Brandmaier | G06F 17/3028 |
| | | | | 705/35 |
| 9,652,460 | B1* | 5/2017 | Barisic | G06F 17/30038 |
| 9,818,173 | B2* | 11/2017 | Gold | G06T 3/4038 |
| 9,824,397 | B1* | 11/2017 | Patel | G06Q 40/08 |
| 2006/0015925 | A1* | 1/2006 | Logan | G06Q 30/02 |
| | | | | 725/135 |

(Continued)

*Primary Examiner* — Tuyetlien T Tran
(74) *Attorney, Agent, or Firm* — Clayton, McKay & Bailey, PC

(57) ABSTRACT

Systems and methods presented herein can allow an inspector or other user to document damage or other information at a house using a mobile device, such as their cell phone. The mobile device can execute an application that allows the user to select a house and a property feature of the house. The user can then take pictures or video, which are stored according to the house and property feature for later retrieval. The user can also select a tag that gets stored and retrieved based on the house and property feature. The user can further record audio for association with the pictures or video.

17 Claims, 19 Drawing Sheets

(56) References Cited

U.S. PATENT DOCUMENTS

| | | | |
|---|---|---|---|
| 2009/0006185 A1* | 1/2009 | Stinson | G06Q 10/10 705/306 |
| 2010/0110074 A1* | 5/2010 | Pershing | G06F 17/5004 345/423 |
| 2010/0296693 A1* | 11/2010 | Thornberry | G06K 9/00637 382/100 |
| 2011/0161117 A1* | 6/2011 | Busque | G06Q 40/08 705/4 |
| 2012/0179431 A1* | 7/2012 | Labrie | G06F 17/5004 703/1 |
| 2013/0317875 A1* | 11/2013 | Parker | G06Q 10/06313 705/7.23 |
| 2014/0055633 A1* | 2/2014 | Marlin | H04N 5/23206 348/220.1 |
| 2014/0067433 A1* | 3/2014 | Hargrove | G06Q 10/10 705/4 |
| 2014/0074733 A1* | 3/2014 | Den Herder | G06Q 10/10 705/306 |
| 2014/0245210 A1* | 8/2014 | Battcher | G06F 3/04842 715/771 |
| 2014/0279225 A1* | 9/2014 | Friedman | G06Q 30/0609 705/26.35 |
| 2014/0279593 A1* | 9/2014 | Pershing | G06Q 50/163 705/314 |
| 2014/0316614 A1* | 10/2014 | Newman | G06Q 30/0611 701/3 |
| 2015/0100578 A1* | 4/2015 | Rosen | G06F 17/30598 707/737 |
| 2015/0172894 A1* | 6/2015 | Gabel | H04W 4/22 455/404.2 |
| 2015/0269151 A1* | 9/2015 | Wallace | H04L 67/10 705/314 |
| 2015/0348204 A1* | 12/2015 | Daues | G06Q 40/08 705/4 |
| 2016/0092959 A1* | 3/2016 | Gross | G06K 9/00671 705/26.62 |
| 2016/0202901 A1* | 7/2016 | Rathod | H04N 5/23245 715/748 |
| 2016/0314545 A1* | 10/2016 | Jessen | G06Q 50/16 |

* cited by examiner

SYSTEMS AND METHODS FOR IMPROVED PROPERTY INSPECTION MANAGEMENT

CROSS REFERENCE TO RELATED APPLICATIONS

This non-provisional patent application is a continuation-in-part of U.S. patent application Ser. No. 15/376,637, filed Dec. 12, 2016, which is a continuation-in-part of U.S. patent application Ser. No. 14/883,620, filed Oct. 15, 2015, which claims priority to U.S. Provisional Patent Application No. 62/177,020, filed Oct. 15, 2014, both of which are hereby incorporated by reference in their entireties.

BACKGROUND

Inspectors for insurance or contracting companies routinely visit homes and other buildings to assess damage and estimate repair costs. During each visit, the inspector usually sketches a floor plan and makes notes about various areas of the home. The inspector can also take pictures of damaged areas of a home. The inspector then takes these sketches back to an office, and recreates the floor plans in computer software for use in preparing an actual estimate. The inspector also must find the photos and associate them with a report, where applicable.

However, there are several drawbacks to this common approach. For example, it takes significant time to recreate a sketched floor plan in existing computer software. Practically speaking, the inspector must do the work twice: first sketching the floor plan in a notebook onsite, and then later manually recreating the floor plan in a computer system. The floor plan can be required as part of determining an insurance adjustment quote or repair estimate. Recreating the sketch can drastically prolong the inspector's workday.

Because of the time involved in recreating the sketches, inspectors often end up carrying around their notes for extended periods until they have an opportunity for recreating the sketches. Because sketches are commonly drawn on paper, a risk exists for the notes being lost or damaged. Often, an inspector uses a notebook, which can increase the risk. Notes are subjected to rain and the elements when the inspector is examining exterior features of a property. Other notes regarding the property similarly can be lost, damaged, or destroyed in the time that lapses before the notes are entered into a computer system.

In many situations, it is not a viable option to directly sketch the floor plan into a computer system with a mobile computing device while onsite. Cell phone screens can be too small for a user to accurately sketch a floor plan. Tablets are often too bulky for certain jobs. For example, when assessing a damaged roof, the inspector might be required to get on top of the house to take measurements. If the inspector drops their tablet, it can slide off the roof and be destroyed. Because of the high breakage risk, it is usually cost prohibitive for a company to outfit a team of inspectors with mobile computing devices for onsite assessments. Therefore, paper-based notes and the attendant shortcomings have remained the norm for inspectors.

Additionally, pictures can get lost or the inspector might not remember what room they depict. Over the course of a long day, where the inspector might take hundreds of photos, the inspector might not even remember what damage was being documented. It might be difficult to determine which pictures apply to which notes.

Therefore, a need exists for systems and methods for improved property inspection management.

SUMMARY

An example described herein includes systems and methods for improved property inspection management. In one example, a mobile device, such as a cell phone or tablet, executes an application for capturing media and other information related to an insurance claim. The application can display a graphical user interface ("GUI") that receives a first selection of a house from a user. The selection can be made from a plurality of houses, such as by specifying an address or owner name.

The mobile device can then receive, on the GUI, a second selection of a property feature of the house. The property feature of the house can be a room, an elevation, or a room feature such as cabinetry or fireplace. The property feature will be used to categorize subsequent pictures or video.

The mobile device can also receive, on the GUI, a third selection of a tag. The tag can be text that relates to a picture. For example, it can describe the type of damage captured or it can simply indicate which room or other property feature is being captured.

The mobile device can receive a press on the GUI, causing a camera to capture first media that is a picture or video. The camera can be built into the mobile device in one example. Alternatively, it can be an external camera, such as that of a drone.

The application can then cause a cloud server to store the first media in association with the house, property feature, and tag. This can ensure that all items are presented together at a later time when the first media is retrieved.

The application can also sort a collection of media that includes the first media based on house and property feature. For example, pictures can be grouped according to property feature. When the user selects the first media, the application also displays the tag with the first media.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various examples and together with the description, serve to explain the principles of the disclosure. In the drawings:

FIG. 2A is an exemplary illustration of a graph template;

FIG. 2B is an exemplary illustration of a graph template;

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, the system allows a user to easily document properties for insurance estimates. A user device, such as a phone or tablet, can execute an application for documenting damage on the property. The user can select a property, such as a house at a particular address. Then the user can select a property feature, such as a room within the house. The user can also select one or more tags for association with the property feature.

The user can then take pictures that are stored in association with the property feature for later retrieval. Taking the picture can also include recording audio. For example, the user can hold the picture button of the graphical user interface ("GUI") and the application can record audio while the picture button is held. The picture can then be stored in association with the property (e.g., the house), the property feature, the tag, and the audio for later retrieval.

The user can open a gallery associated with the house. The pictures can be sorted by property feature, such as rooms. When the user selects a picture, the tag and audio can also be presented. This can greatly decrease the time it takes to both document and review an insurance claim.

Figure 1:
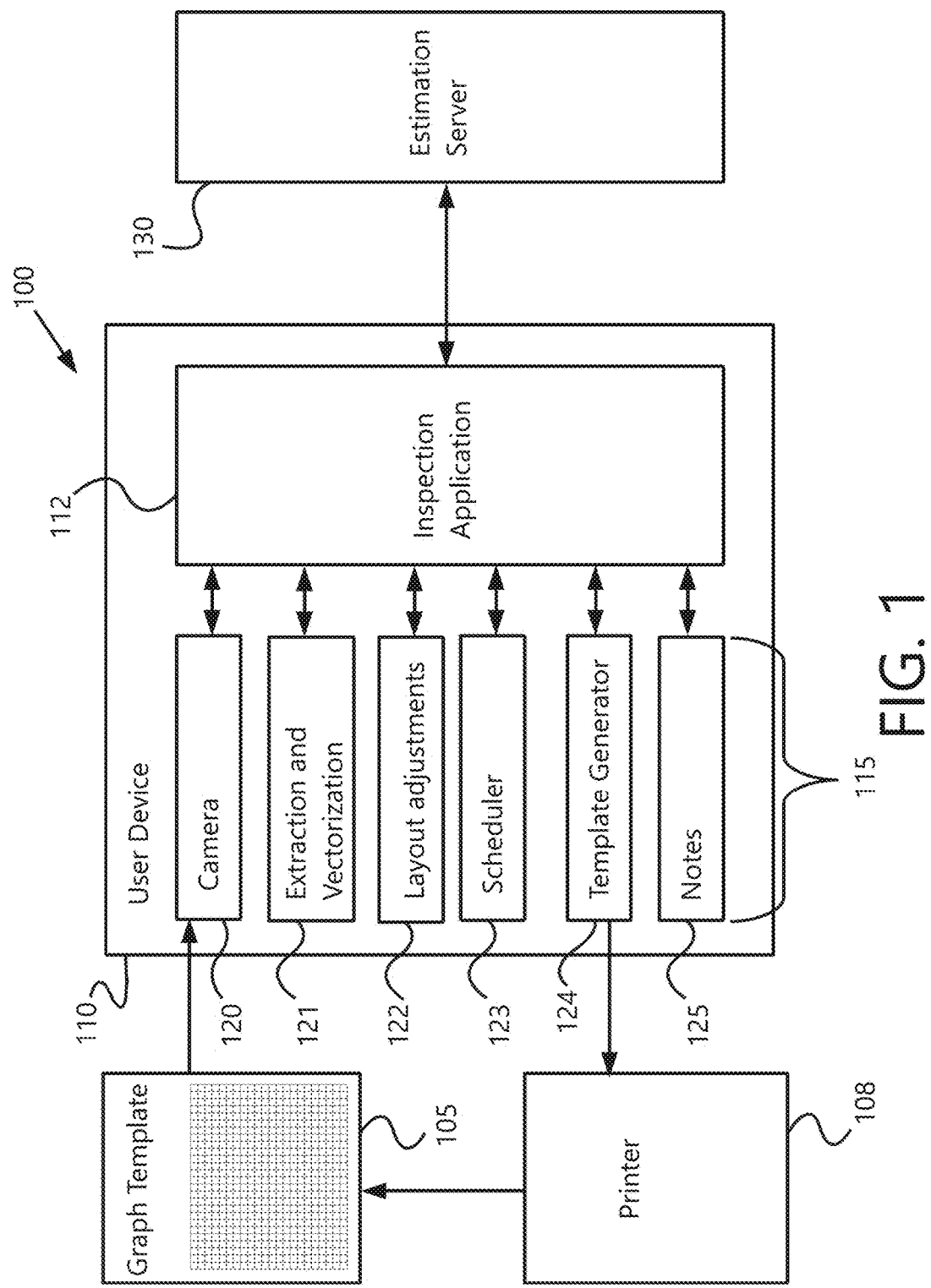
FIG. 1 is an exemplary illustration of a system for improved property inspection management.

FIG. 1 shows an exemplary illustration of a system 100 for improved property inspection management. The system 100 can manage the floor plan generation process for the purposes of insurance adjustment and other estimates. In one example, a system 100 generates a graph template 105 that the user prints and annotates by sketching a floor plan and provide additional property information. The system 100 reads the graph template 105 to collect the property information and sketch, converting both into information used at an estimation server 130.

The user can be an inspector, such as an appraiser or insurance adjuster. The user can use a user device 110 for some of the system functions. The user device 110 can be a mobile computing device, such as a cell phone, tablet, laptop, or smart camera. The user device 110 can include a camera component for taking a picture (e.g., photograph) of an annotated graph template.

In one example, an inspection application 112 executes on the user device 110. The inspection application 112 can communicate over a network with an estimation server 130. The network can be the Internet, a cellular network, a local area network, a workstation peer-to-peer network, a direct link network, a wireless network, or any other suitable communication platform. The inspection application 112 can include multiple functions 115. Any of the functions 115 can alternatively be partially or fully executed on the estimation server 130 in an example.

The inspection application 112 can include a template generator 124 function for generating graph templates 105. The template generator 124 can generate a graph template 105 for use by the user in evaluating a property. As explained more thoroughly with regard to FIG. 2A, below, the graph template 105 can include an information region and a graph region. The information region can include any portion of the graph template that includes options for user selection regarding the property. The user can sketch in the graph region, and provide information about the property in the information region.

The graph template 105 can be printed by a printer 108 in one example. Printing can be triggered by the inspection application 112 on the user device 110. The graph template 105, therefore, can be physically represented on a piece of paper. In one example, specialized paper already having some or all of the information region and graph region is used as print media. The specialized paper can already include an information region with blank areas for filling during printing. It can also include a graph region with a grid. This can help ensure that the grid is of a particular color that can assist the system 100 with processing the sketch at a later stage. The specialized paper can be weather resistant in one example. In one example, the specialized paper can include a sticker layer that the user can peel off and attach to a folder or other media. In yet another example, the graph template 105 can be printed directly onto a folder.

Therefore, generating the graph template 105 can include providing information for printing onto a specialized paper in one example.

In one example, the template generator 124 customizes the graph template 105 for a particular property that the user is scheduled to visit. This can include generating custom property information (e.g., property characteristics) in the information region. This can include custom input options that the user fills out while onsite at the property. This can help ensure that the user collects the relevant data for that particular property, based on the property and the task being performed at the property.

The inspection application 112 can determine how to customize the graph template 105 by communicating with the estimation server 130 in one example. The estimation server 130 can execute a backend component that can communicate with the inspection application 112. The estimation server 130 can access a database to provide property information and/or user information to the inspection application 112 for user in the graph template 105.

In one example, the estimation server 130 schedules a plurality of properties that the user will visit that day based on the information in the database. The estimation server 130 can communicate property information and sequencing for the plurality of properties to the inspection application 112. Alternatively, the inspection application 112 can include a scheduler function 123 that can sort which property the user should visit first. Then, the template generator 124 can generate and print the graph templates 105 in sequence.

The graph templates 105 can be customized by the system 100 to include property-specific information in the information region. The property-specific information can identify the property address, the scheduled time for arrival, and the sequencing respective to the other properties that the user is scheduled to visit that day.

The template generator 124 can also provide custom options that require input from the user based on examination of the property. For example, the information region can be customized to include options relevant to a homeowner insurance inquiry particular to a first property. In this way, the graph template 105 can be customized to prompt the user to collect relevant information while at the property (e.g., onsite).

Additionally, the user can sketch a floor plan in the graph region. This can include annotating the sketch with symbols to indicate elements such as windows and doors, or particular rooms.

Once the user has entered all relevant annotations, the user can take a photo of the graph template 105 with the user device 110. In one example, the inspection application 112 includes a camera interface 120 for this purpose. The camera interface 120 can include a graphical overlay that the user can align with markings on the graph template 105. Aligning the graphical overlay can reduce picture distortion from taking a picture at an angle. The user can take the picture using the user device 110. It can also allow the inspection application 112 to reliably distinguish the graph portion from the rest of the graph template 105. In one example, the camera interface 120 automatically recognizes when the graphical overlay is properly aligned with the markings on the graph template 105, and automatically captures a photo of the graph template 105 based on the proper alignment.

Next, an extraction component 121 can gather user annotations from the photo of the graph template 105. The extraction component 121 can execute partially or fully on the user device 110 or the estimation server 130, depending on the implementation.

The extraction component 121 can gather information from the information region. To do this, the extraction component 121 can first identify the graph template 105 based on a graph template identifier. This can provide the extraction component with the X and Y coordinates where particular user annotations can be located for selecting the customized options in the information section. If a particular location is darkened, then the extraction component 121 can count the option as selected. The extraction component 121 can also utilize text recognition technology to read handwritten notes at designated locations.

The extraction component 121 can also include a vectorizer method. The vectorizer method can perform a series of stages for adjusting the photograph for machine reading and converting the hand-drawn sketch into a vectorized floor plan. The photograph adjustments can be applied to the entire graph template 105 or just the graph region, depending on the implementation. Then, the vectorizer method can include a series of graphical manipulations that allow the user device 110 or estimation server 130 to recognize lines drawn by the user. The recognized lines are used to generate the vector floor plan. An example vectorizer method is more thoroughly explained below with regard to FIG. 5. An example illustration is also provided in FIG. 4A.

Continuing with FIG. 1, in one example, the extraction component 121 can recognize text written into the sketch by the user. The text can include codes that designate particular rooms or other information in the sketch. The extraction component 121 can convert the codes into text that is stored with the vectorized floor plan. This can include storing coordinates for the text, or graphically inserting the text into the floor plan and storing the graphical representation of the floor plan.

The inspection application 112 can provide additional functions for adjusting the information collected during extraction 121. For example, the user can make layout adjustments 122 in one example. This can allow a user to manually edit the vectorized floor plan. In one example, the user can open the vectorized floor plan from the estimation server 130. The user can edit the vectorized floor plan by labeling rooms or other aspects of the floor plan or by changing wall locations. The user can drag room walls to modify the floor plan in one example. The modified floor plan can then be uploaded back to the estimation server 130.

Additionally, the inspection application 112 can include a notes component 125 that allows the user to input additional notes regarding the property. These can include notes that are in addition to user notes supplied in the predefined information region of the graph template.

The inspection application 112 can send, to the estimation server 130, property information including extracted information, notes, adjustments, graph template photo, and floor plan (sketch and/or vectorized). This can allow either the user or another user (e.g., administrator, boss, or coworker) to review the collected information, add to the information, or perform additional analytics.

The system 100 can also generate reports based on the stored property information. In one example, the report gives a narration of an estimate (e.g., for repair) based on the property information extracted from the information region of the graph template. In one example, the estimation server 130 also includes an application program interface (API) that allows another server or system to connect to it and retrieve the property information for preparation of an inspection or estimation report.

In one example, the user device 110 can print a finalized inspection or estimation report. The estimation server 130 can send final information, including the stored property information and vectorized floor plan, to the user device 110. From there, the user device 110 can print the final information using a printer 108. The final information can be printed onto the specialized paper that already includes an information region and graph region. This can entail printing the user selections and typed versions of previously handwritten text into the information region. It can also include printing the vectorized floorplan onto the grid of the graph region. In another example, the finalized inspection report is printed onto normal paper, but information from the specialized paper for graph templates is also printed onto the normal paper.

Figure 2A:
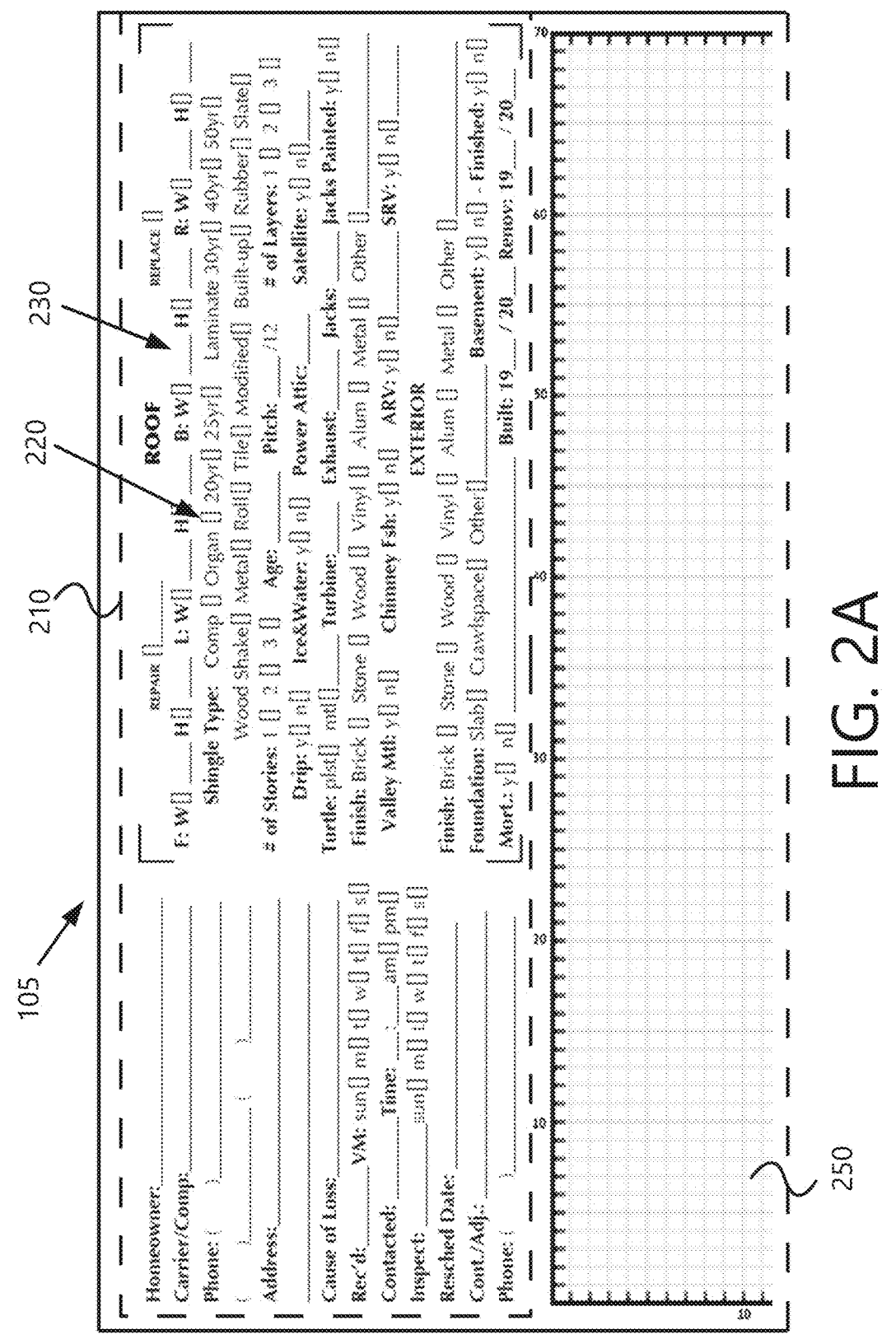

Turning to FIG. 2A, an example graph template 105 is illustrated. The graph template 105 can include an information region 210. The information region 210 can include options for selection by the user as part of the user's onsite analysis. In one example, these options are customized for the property and job by the system 100. As an example, the graph template 105 of FIG. 2A can be generated for a property being evaluated for an insurance claim based on roof and exterior damage. Options describing shingle type, age, pitch, layers, and other roof features can be included by the system 100. Similarly, options to describe the exterior can be included. These options can include the finish material (e.g., brick, stone, wood, vinyl, metal, and other). In this way, portions of the information region 210 can act as a checklist or questionnaire for the user to complete during analysis of the property.

Many of the options can be provided with a target 220 for the user to mark if the option applies. When the user photographs the graph template 210, the extraction component 121 can check at coordinates for each target 220 to determine if the user has selected the target.

Other options include a blank 230 for the user to write in a response. The extraction component 121 can check at coordinates for each blank 230 and perform text recognition to gather the written information.

In one example, known property information can be provided by the estimation server 130 and included by the template generator component 124 in the information region 210. Though not pictured in FIG. 2A, homeowner information including the name, carrier, phone, address, and other known information can be pre-populated into the graph template 105. This can serve as notification to the user that the information already exists at the estimation server 130. The can allow the user to focus on collecting information that has not yet been gathered and does not already exist in the graph template 105.

In one example, the graph template 105 can be two-sided. The first side can include a first information region for exterior inspection and the second side can include a second information region for interior inspection. It is understood that the information region 210 can include multiple information regions.

The graph template 105 can also include a graph region 250. The graph region 250 (partially shown in FIG. 2A) can include a grid that acts as a guide for the user to sketch a floor plan. The floor plan can include dimensions of rooms relevant to the estimation task. Alternatively, the floor plan can consist of roof dimensions relevant to the estimation task.

An information region 210 above, beside, or below the graph region 250 can include options that identify what is being illustrated. For example, if the property has multiple floors, then the information region 210 can include an option for each floor. The user can select the floor that they are sketching. A graph template 105 can include multiple pages for a single property when the system 100 detects that there are multiple floors.

The information region 210 can also allow the user to select a scale for applying to the grid. This can allow the system 100 to interpret the dimensions of the lines drawn by the user. In one example, the system 100 sets the scale automatically based on property information regarding a structure size. In that example, the printed graph template 105 can already indicate the scale.

Figure 2B:
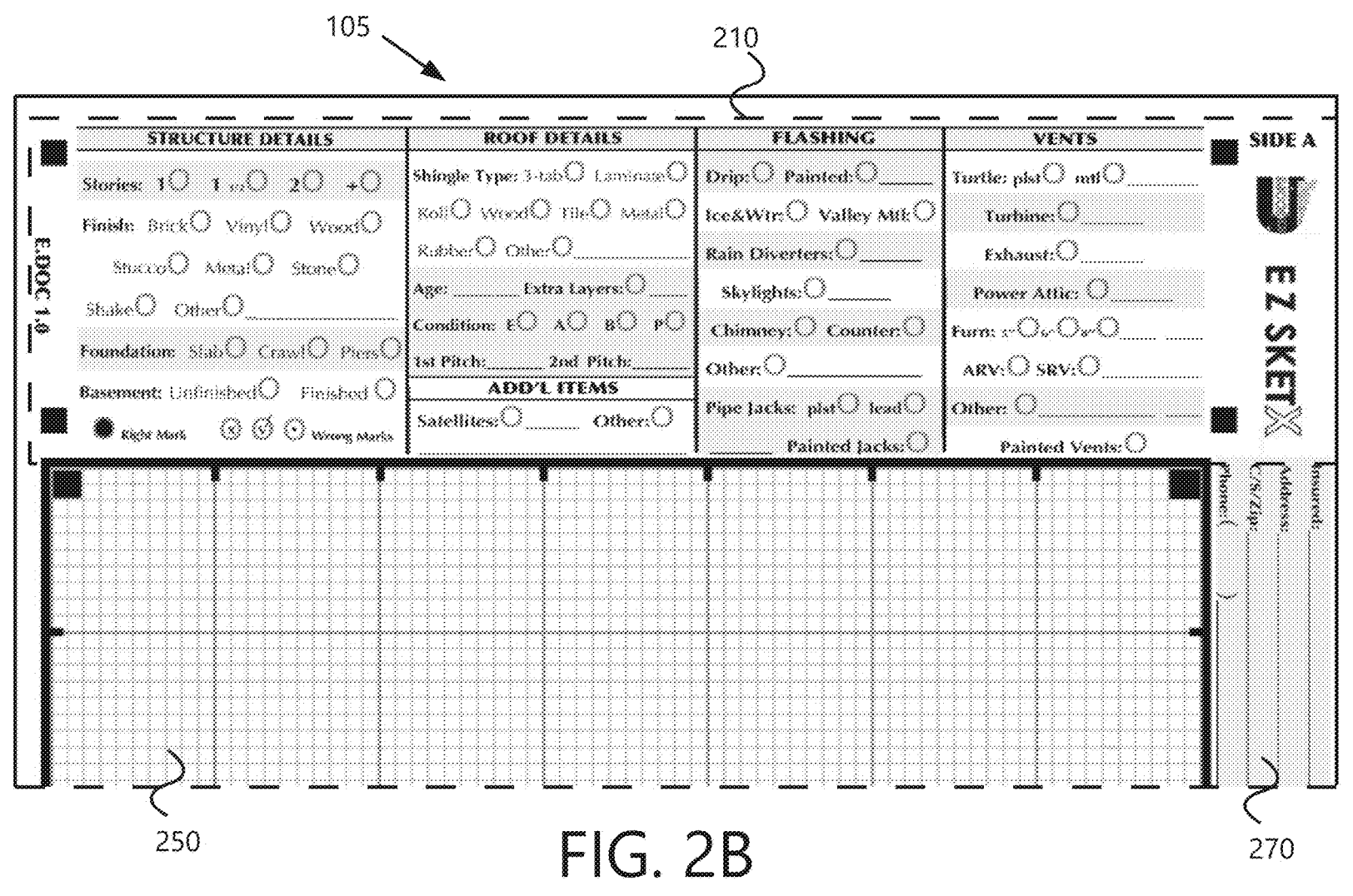

FIG. 2B includes another example graph template 105. The information region 210 can include options for selecting stories, finish materials, foundation type, roof details and materials, flashing attributes, vent information, room details, and other structure details. A second information region 270 can be located along a region between the graph region 250 and a side border of the page.

Figure 3:
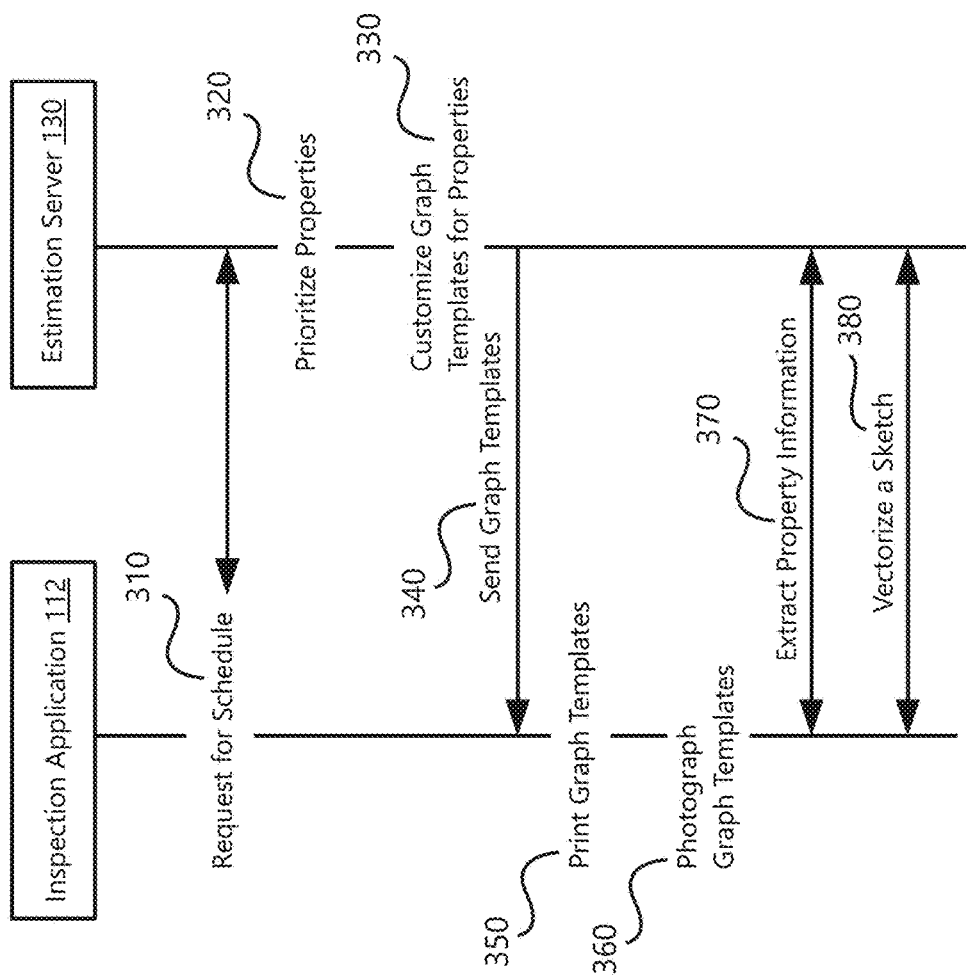
FIG. 3 is an exemplary flow chart with example stages for scheduling property visits and generating a floor plan.

FIG. 3 includes an exemplary illustration of stages performed between an inspection application 112 and estimation server 130. At stage 310, the inspection application 112 can request a schedule of properties to visit from the estimation server 130. The request can incorporate calendar information available at the user device 110. For example, if the user has particular times and locations already scheduled, this information can be provided to the estimation server 130. The request can occur automatically at a scheduled time during the night or each morning in an example.

In response to the request, at stage 320 the estimation server 130 can prioritize the properties. This can include pulling open jobs from a database based on the user's skill group and location. A skill group can indicate a group of tasks the user is capable of performing. Jobs stored in the database can include a skill group identifier to describe the level of employee that will be needed for the job. The job location can be the property location. The estimation server 130 can attempt to assign a plurality of properties, sequenced such that adjacent properties in the sequence are located relatively near to one another. In another embodiment, the jobs are sequenced by the inspection application 112 at the user device 110.

At stage 330, the estimation server 130 can customize graph templates 105 for one or more of the prioritized properties. In one example, this includes providing property information from the database in the information region of the graph template 105. It also include providing custom options based on the property information or job information. Other customizations include setting the scale of the grid in the graph region based on square footage information for the property. In another example, stage 330 is performed at the inspection application 112 based on property information received from the estimation server 130.

At stage 340, the estimation server 130 sends the graph templates to the inspection application 112. This can include sending images to print in one example. In another example, this includes sending data, such as property information, to the inspection application 112 that the inspection application 112 can use to assemble a customized graph template.

The estimation server 130 can alternatively or additionally send a schedule of properties to the user device 110. The schedule can be sent over email in one example, and incorporated into a calendar application on the user device 110.

At stage 350, the inspection application 112 can print the graph templates. The graph templates can be printed in order based on an optimal visitation sequence for the plurality of properties. This can allow the user to take a stack of graph templates 105 that are pre-organized for the day's tasks. Printing can also include printing multiple sheets for properties known to have multiple levels that will need to be independently sketched.

After the onsite portion of a job is complete, at stage 360 the user can photograph the graph templates. This can include lining up markers on a graph template 105 with guide graphics in a camera module 120 of the inspection application 112. The same or additional grid markers can be used by the inspection application 112 during extraction and vectorization 121. For example, grid markers (e.g., numbers, symbols, colored lines, or dashes at the border of the grid) can allow the inspection application 112 to interpret the scale and location of a portion of the sketch within the graph region 250.

At stage 370, the inspection application 112 and/or estimation server 130 can extract property information. In one example, a code or other information in the graph template 105 can be used by the system 100 to determine which coordinates to check for property information. This can allow the system 100 to read different graph templates 105 that collect different information. The system 100 can check all of the applicable coordinates, reading text where applicable.

In one example, the inspection application 112 extracts a property characteristic from the information region. The property characteristic can be a selection in an inspection checklist.

At stage 380, the inspection application 112 and/or estimation server 130 can vectorize a sketch located in the graph region 250. This can include one or more of the steps in FIG. 6 in an example. In one example, perspective modifications are performed prior to or as part of stages 370 or 380 to account for image distortions and curvature of the graph template 105 in the picture.

In one example, the picture or information recognized in the picture is sent to the estimation server 130 or some other server for vectorization and machine reading. The inspection application 112 can extract some information but leave more intensive processes to be performed at a server. Once the vectorization is complete, the floor plan and property information can be sent to the inspection application 112 or the estimation server 130.

Figure 4A:
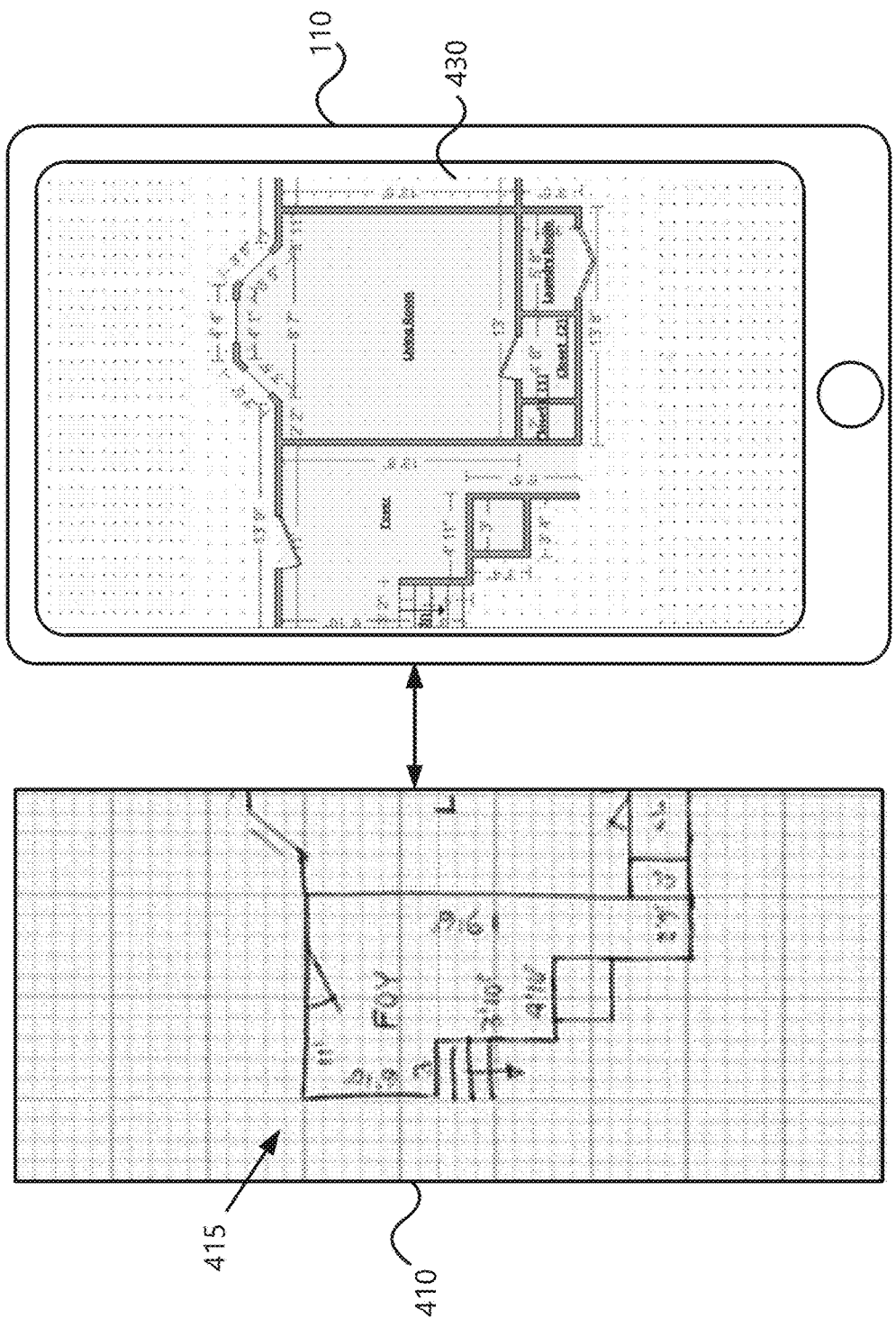
FIG. 4A is an exemplary illustration of a graph region that is converted into a floor plan.

An example illustration of the vectorization is shown in FIG. 4A. A partial graph region 410 includes a hand-drawn sketch 415 by the user. The sketch can generally follow the gridlines of the graph region 410, which can allow the inspection application 112 to accurately track relative positions and sizes.

Codes can be recognized as identifying the type of room. In this example, "FOY" stands for Foyer. Other symbols for doors and windows can also be recognized by the inspection application 112 and/or estimation server 130.

As a result of vectorization, the sketch 415 can be transformed into a vectorized floor plan 430 and displayed on the computing device 110. The vectorized floor plan can include clean lines, room identifiers based on codes provided by the user, and wall dimensions. Similar output is possible based on floor plans that are room dimensions.

Figure 4B:
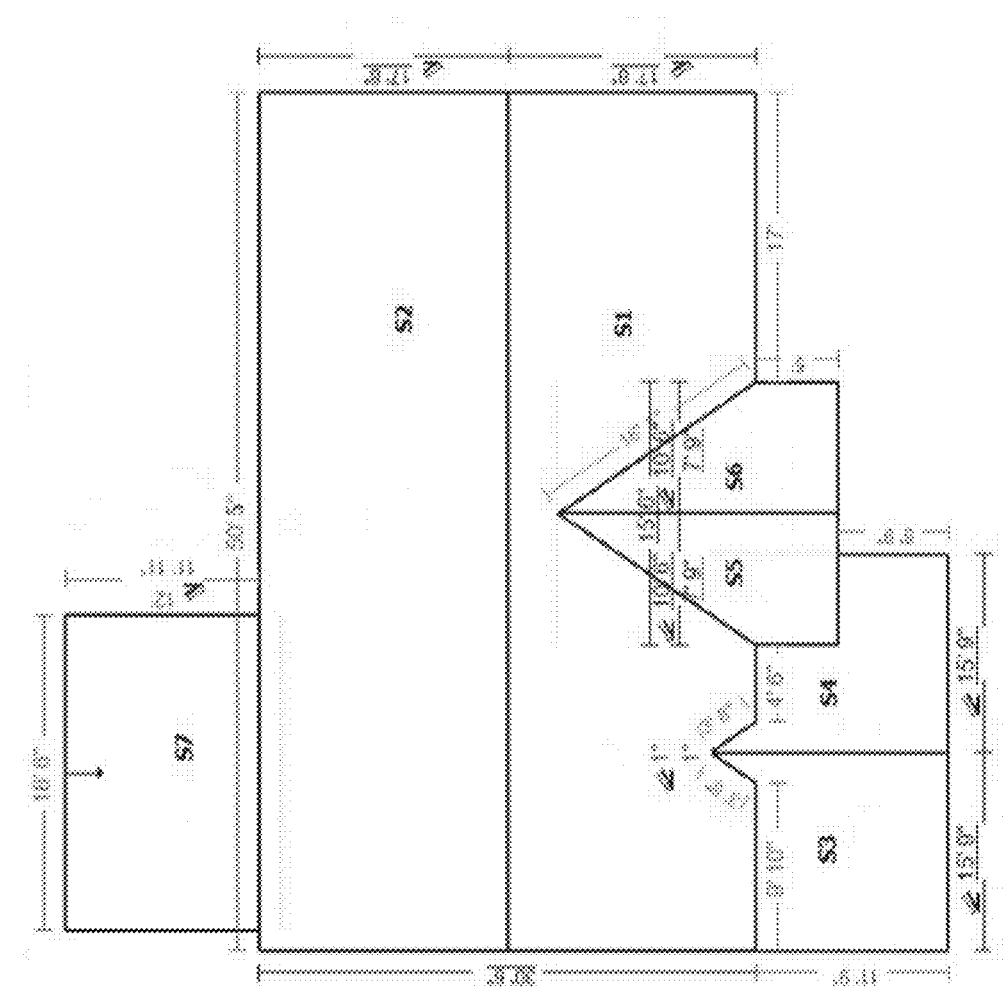
FIGS. 4B, 4C, and 4D are exemplary illustrations of a converted floor plan.
Figure 4C:
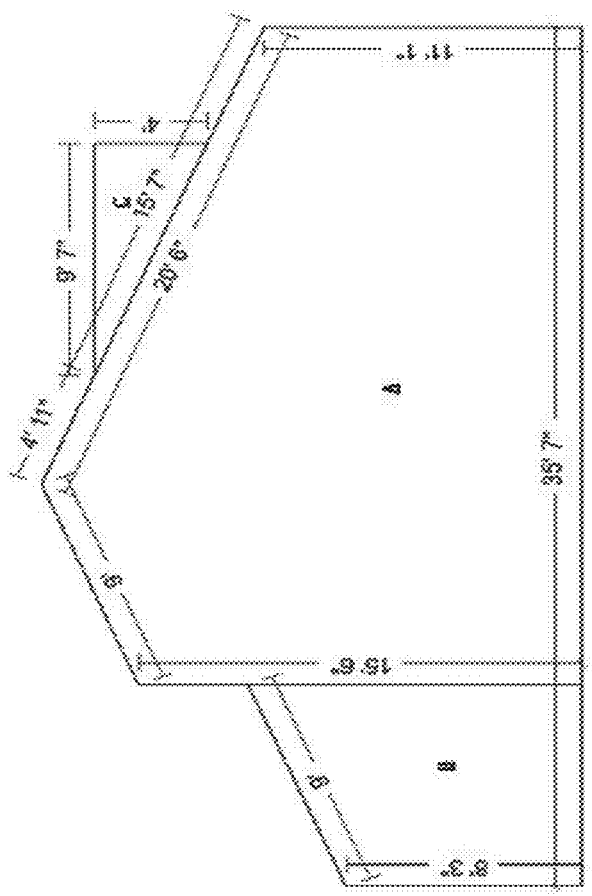
Figure 4D:
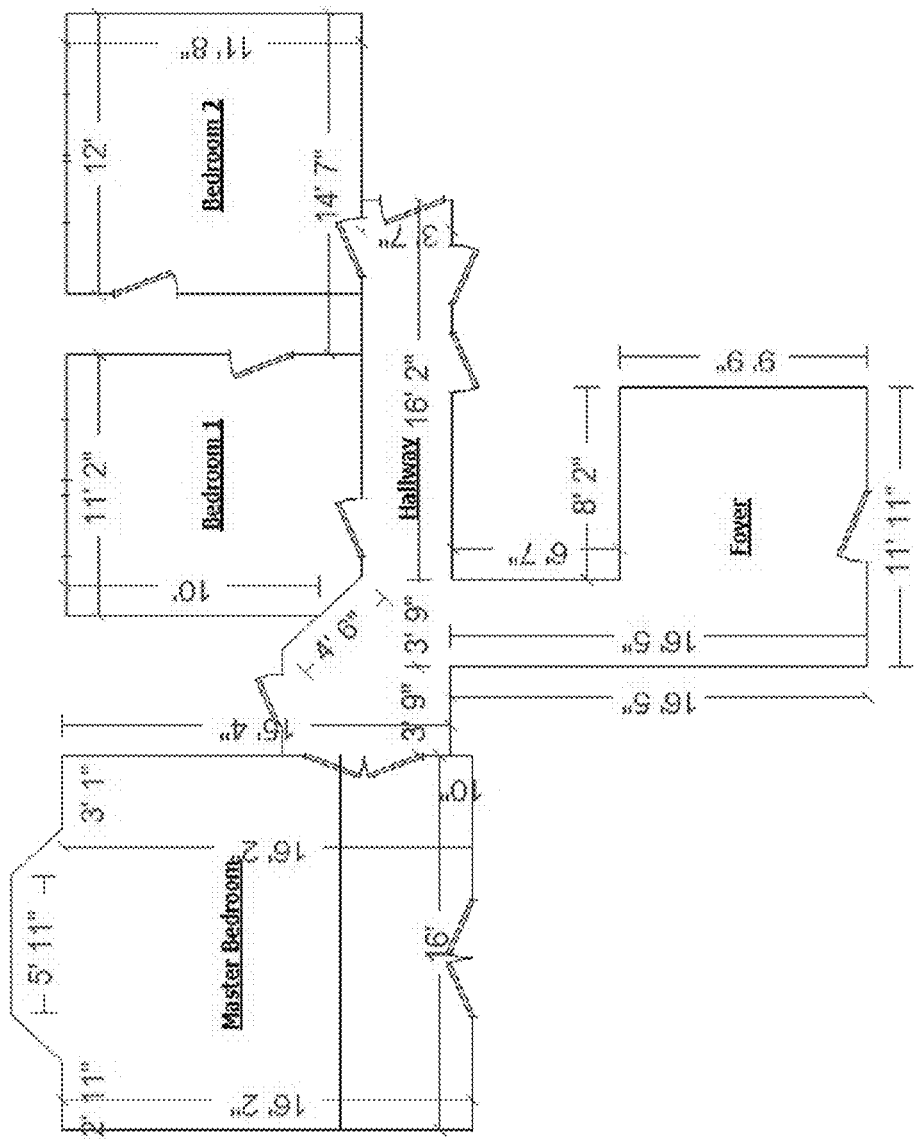

FIGS. 4B-4D illustrate an additional vectorized floor plan. As used herein, the floor plan can include roof layout, as shown in FIG. 4B. The floor plan can also include an elevation layout, as shown in FIG. 4C. Further, it can include a room layout, as shown in FIG. 4D. It is to be understood that a vectorized floor plan can include one or more of a roof layout, elevation layout, or floor layout.

Figure 5:
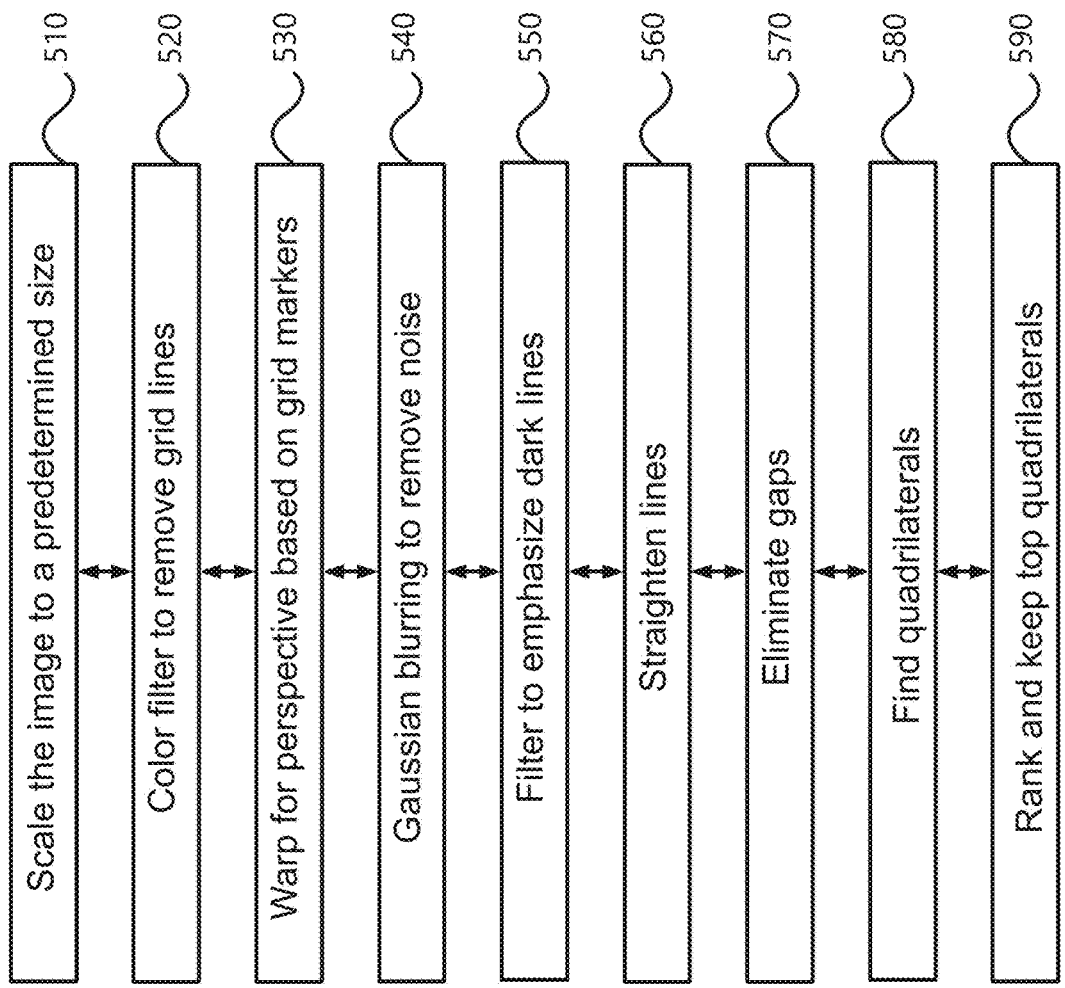
FIG. 5 is an exemplary method.

FIG. 5 illustrates exemplary stages for vectorizing a sketch to create a floor plan in one example. The stages can be performed by a one of or a combination of the inspection application 112 and the estimation server 130. As used herein, "vectorizing" can include one or more stages of FIG. 5, and generally includes detecting lines that are drawn as part of the sketch.

At stage 510, the system 100 can scale the image (e.g., photograph) to a predetermined size. This can include analyzing the image resolution and dimensions, and adjusting the resolution and dimensions to meet a predetermined size. By working with a predetermined size and dimensions, the system 100 can more consistently identify lines in the sketch that belong in the floor plan.

At stage 520, the system 100 can apply a color filter to remove grid lines. The color filter can be set to eliminate the specific color of the gridlines, including variations attributable to lighting conditions. In one example, the color filter can be calibrated for the camera on a particular user device 110 by the user taking a picture when the grid is empty. The inspection application 112 can analyze the empty grid lines to determine the color setting for the color filter.

At stage 530, the system 100 can warp the image perspective based on grid markers. This can include locating grid markers at the corners of the grid in one example. The image can be scaled such that the corner grid markers are brought into a predetermined spatial relationship from one another (e.g., forming a rectangle). The image is further stretched and skewed to align grid markers between the corners into horizontal or vertical lines. This can help eliminate distortion caused by picture angle or a graph template 105 page that was curved instead of flat during picture taking. This stage can be performed alternatively or additionally after quadrilaterals are recognized in stage 580.

At stage 540, the system 100 can apply Gaussian blurring to remove noise and artifacts. Some noise and artifacts can be introduced during the scaling stage 510. The Gaussian blurring can include choosing a Nyquist limit based on analysis of the frequency components of the image.

At stage 550, the system 100 can apply a filter to emphasize dark (e.g., thick) lines. A first set of filters can be applied to recognize horizontal and vertical lines. These lines can be weighted as likely to be lines sketched by the user. Another filter can be applied to recognize adjacent pixels that are darker than first and second thresholds. If the adjacent pixel is darker than the first threshold, it can be part of a line. If the adjacent pixel is darker than the second threshold it is decided to be part of the line. This can cause the vectorizer component to also weight pixels along the line that only pass the first threshold as part of the line.

At stage 560, the system 100 can straighten the lines. An algorithm can create a line by determining that a line point is within a deviation threshold from a sketch pixel while maintaining a straight line.

At stage 570, the system 100 can eliminate gaps by detecting aligned line segments. For example, gaps that exist between segments that could otherwise form a continuous straight line are recognized. These gaps can be filled by connecting the segments into a continuous line. Spikey lines or lines with small off-shoots can also be ignored or corrected to result in a continuous line. The spikey lines can be the result of part of the grid being scanned as part of the sketch. For example, numeric grid borders can form spikey lines in the picture.

At stage 580, the system 100 can find quadrilaterals. This can include finding shapes that are formed by connected by straight lines. Quadrilaterals are also identified by determining fillable shapes in one example.

At stage 590, the system 100 can rank and keep a threshold number of quadrilaterals. The rankings can be based on darkness, the fewest gaps, and the most horizontal and vertical lines.

This can result in a vectorized floor plan. The inspection application 112 can then add labels, such as room labels and dimensions to the vectorized floor plan in an example.

Figure 6:
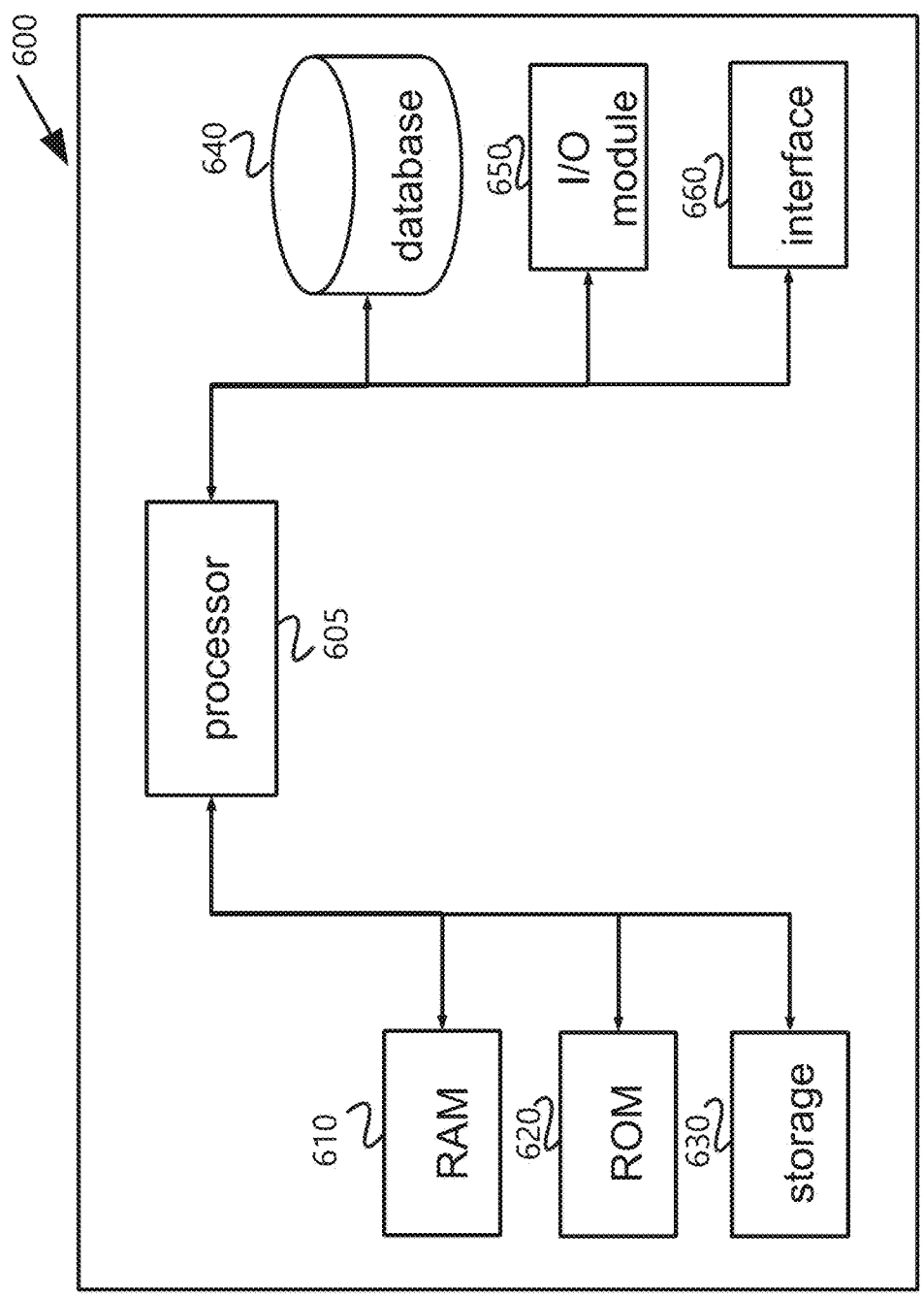
FIG. 6 is an exemplary illustration of system components.

FIG. 6 depicts an exemplary processor-based computing system 600 representative of the type of computing system that can be present in or used in conjunction with an adjustment server 130 or a computing device 110 of FIG. 1. The computing system 600 is exemplary only and does not exclude the possibility of another processor- or controller-based system being used in or with one of the aforementioned components. Additionally, a computing device or system need not include all the system hardware components in an example.

In one aspect, system 600 can include one or more hardware and/or software components configured to execute software programs, such as software for storing, processing, and analyzing data. For example, system 600 can include one or more hardware components such as, for example, processor 605, a random access memory (RAM) module 610, a read-only memory (ROM) module 620, a storage system 630, a database 640, one or more input/output (I/O) modules 650, and an interface module 660. Alternatively and/or additionally, system 600 can include one or more software components, such as a computer-readable medium including computer-executable instructions for performing methods consistent with certain disclosed examples. It is contemplated that one or more of the hardware components listed above can be implemented using software. For example, storage 630 can include a software partition associated with one or more other hardware components of system 600. System 600 can include additional, fewer, and/or different components than those listed above. It is understood that the components listed above are exemplary only and not intended to be limiting.

Processor 605 can include one or more processors, each configured to execute instructions and process data to perform one or more functions associated with system 600. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 6, processor 605 can be communicatively coupled to RAM 610, ROM 620, storage 630, database 640, I/O module 650, and interface module 660. Processor 605 can be configured to execute sequences of computer program instructions to perform various processes, which will be described in detail below. The computer program instructions can be loaded into RAM for execution by processor 605.

RAM 610 and ROM 620 can each include one or more devices for storing information associated with an operation of system 600 and/or processor 605. For example, ROM 620 can include a memory device configured to access and store information associated with system 600, including information for identifying, initializing, and monitoring the operation of one or more components and subsystems of system 600. RAM 610 can include a memory device for storing data associated with one or more operations of processor 605. For example, ROM 620 can load instructions into RAM 610 for execution by processor 605.

Storage 630 can include any type of storage device configured to store information that processor 605 can need to perform processes consistent with the disclosed examples.

Database 640 can include one or more software and/or hardware components that cooperate to store, organize, sort, filter, and/or arrange data used by system 600 and/or processor 605. For example, database 640 can include user account information, property information, device settings, and other user preferences or restrictions. Alternatively, database 640 can store additional and/or different information. Database 640 can also contain a plurality of databases that are communicatively coupled to one another and/or processor 605, which can be one of a plurality of processors utilized by a server or computing device.

In one example, the database 640 can include one more tables that store a property identifier, property description information, a job identifier, job information, user information (e.g., skill group), a graph template identifier, and graph template attributes. In one example, a separate table links a property identifier to a graph template identifier. A table can also link a user identifier to one or more property identifiers, job identifiers, and graph template identifiers.

I/O module 650 can include one or more components configured to communicate information with a user associated with system 600. For example, I/O module 650 can include a console with an integrated keyboard and mouse to allow a user to input parameters associated with system 600. I/O module 650 can also include a display including a graphical user interface for outputting information on a monitor. I/O module 650 can also include peripheral devices such as, for example, a printer 108 for printing information associated with system 600, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 660 can include one or more components configured to transmit and receive data via a communication network, such as the Internet, a local area network, a workstation peer-to-peer network, a direct link network, a wireless network, or any other suitable communication platform. For example, interface 660 can include one or more modulators, demodulators, multiplexers, demultiplexers, network communication devices, wireless devices, antennas, modems, and any other type of device configured to enable data communication via a communication network.

The system can also enable a user to capture photographs using voice commands. This can be advantageous in situations where the user is holding a photo-capable device, such as a camera or phone, but is unable to access the mechanism for taking the photograph—for example, while holding a phone with one hand. The voice command also allows the user to focus on holding the camera or phone, rather than maneuvering it in their hand to access a button. This extra security against dropping the device is especially useful when the user is on a ladder or roof, for example.

A user interface of the device can provide instructions to the user for operating the camera or labeling a photo with a voice command. For example, the device can overlay an instruction that reads "Say 'take photo'" underneath the standard button for taking a photograph. The voice command can be changed and customized as the user wishes. A separate message can be displayed to guide the user to speak regarding assigning the photograph to a room or including additional voice notes with the photograph.

Before or after the photograph has been taken, the user can provide an identifier to the photograph. In some examples, the device prompts the user with various options for identifiers, such as a list of identified rooms or areas in a property. The list of identified rooms or areas in the property can be based on identifiers provided to those rooms or areas on the digital floor plan. In the example floor plan of FIG. 4B, the identifiers can be S1-S7. In the example floor plan of FIG. 4D, the identifiers can be "master bedroom," "bedroom 1," "bedroom 2," "hallway," and "foyer." The user can customize the identifiers associated with the portions of property shown by the floor plan. These identifiers can be presented to the user to associate with a photograph.

In another example, the device can present the user with a graphical representation of the floor plan for the property and prompt the user to select a region that corresponds to the photograph just taken by the user. The device can then associate the photograph with that portion of the property.

In yet another example, the device can receive verbal instructions from the user regarding associating the photograph with the property. For example, the device can prompt the user to say the identifier that should be associated with the photograph. The user can respond by saying "S1" in the example of FIG. 4B, or "Hallway" in the example of FIG. 4D. The device can associate the photograph with the portion of the property identified verbally by the user.

The device can also display a thumbnail of a photograph in a location associated with a portion of the property or floor plan. For example, when displaying the floor plan, the device can display thumbnails of photographs in their corresponding rooms or regions of the floor plan.

The system can also allow a user to input notes verbally. For example, the user can first record an audio note using a microphone of the device. The system can transcribe the audio note into text and associate that text with a photograph or a portion of the property. The association can be based on the context of the audio note or based on additional input from the user, such as selecting a room of a property before or after recording the audio note.

Figure 7:
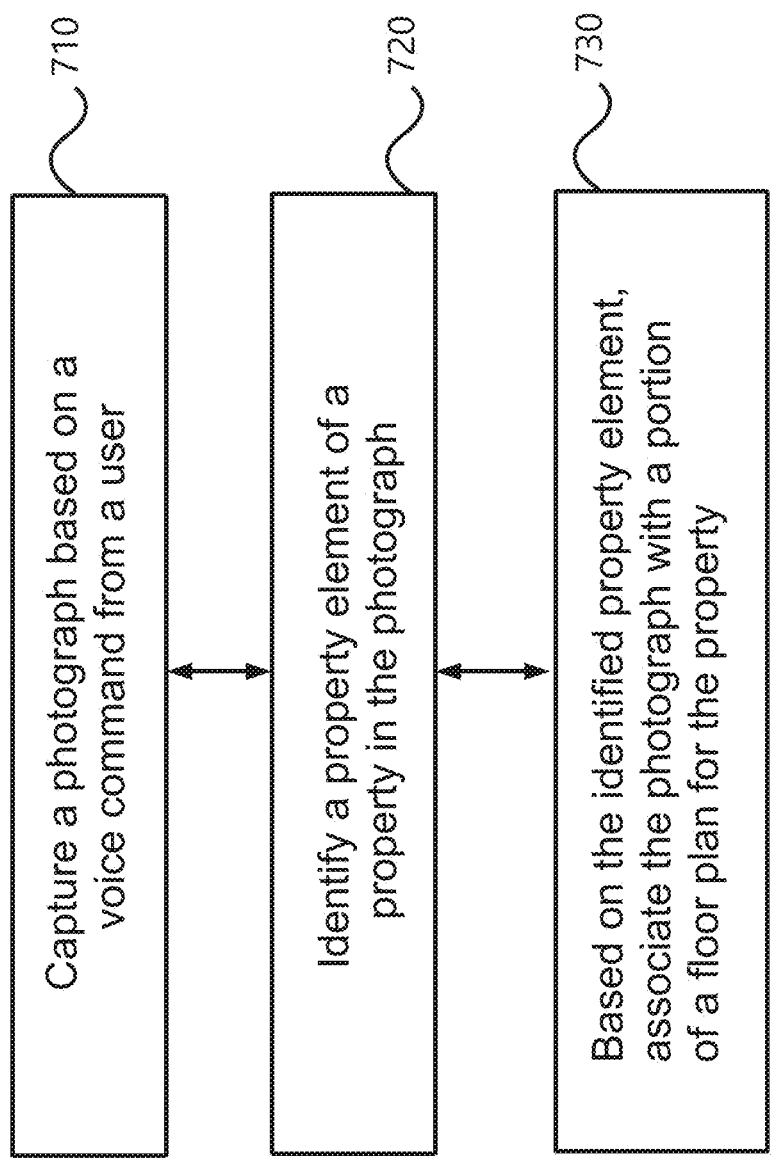
FIG. 7 is an exemplary method of associating a photograph with a portion of a floor plan.

FIG. 7 provides an example method for associating a photograph with a portion of a floor plan. Stage 710 of the method includes capturing a photograph based on a voice command from a user. Alternatively, step 710 can be performed manually when the user physically presses a button or image to cause the user device to take a photo. The voice command can be a word or phrase that instructs a device to take a photograph. The word or phrase can be customized by the user as desired.

Stage 720 of the method includes identifying a property element of a property in the photograph. In one example, the system uses image recognition to identify the property element. A property element can include a room, an area, a region, fixture, and/or a feature of the property. Examples include a bedroom, foyer, hallway, fireplace, kitchen cabinets, kitchen island, stovetop, roof materials, bathtub, vandalized material, hail damaged object, water stain/damage, mold growth, or fire or smoke damage. The step of identifying a property element can be performed by the user providing input to the device, or automatically by the device.

In the case of automatic identification, the device can compare the photograph to other photographs in a database. For example, the device can access a database on a remote server that includes a large number of photographs. The photographs on the database can be classified by property elements, such that a close match would indicate that the photograph taken by the user relates to a particular property element. As an example, a photograph of a bathroom can be compared to photographs stored on the server until one or more matches are found. Those matches can be associated with a "bathroom" category and a "tile floor bathroom" subcategory. The device can then match the category with a property element of a property, such as the bathroom.

Stage 730 can include associating the photograph with a portion of a floor plan for the property based on the identified property element. This stage can include, for example, storing information associating the photograph with a portion of the floor plan. Continuing the previous example, after matching the photograph with the "bathroom" category, the device can store information associating the photograph with a bathroom identified on the floor plan.

Figure 8:
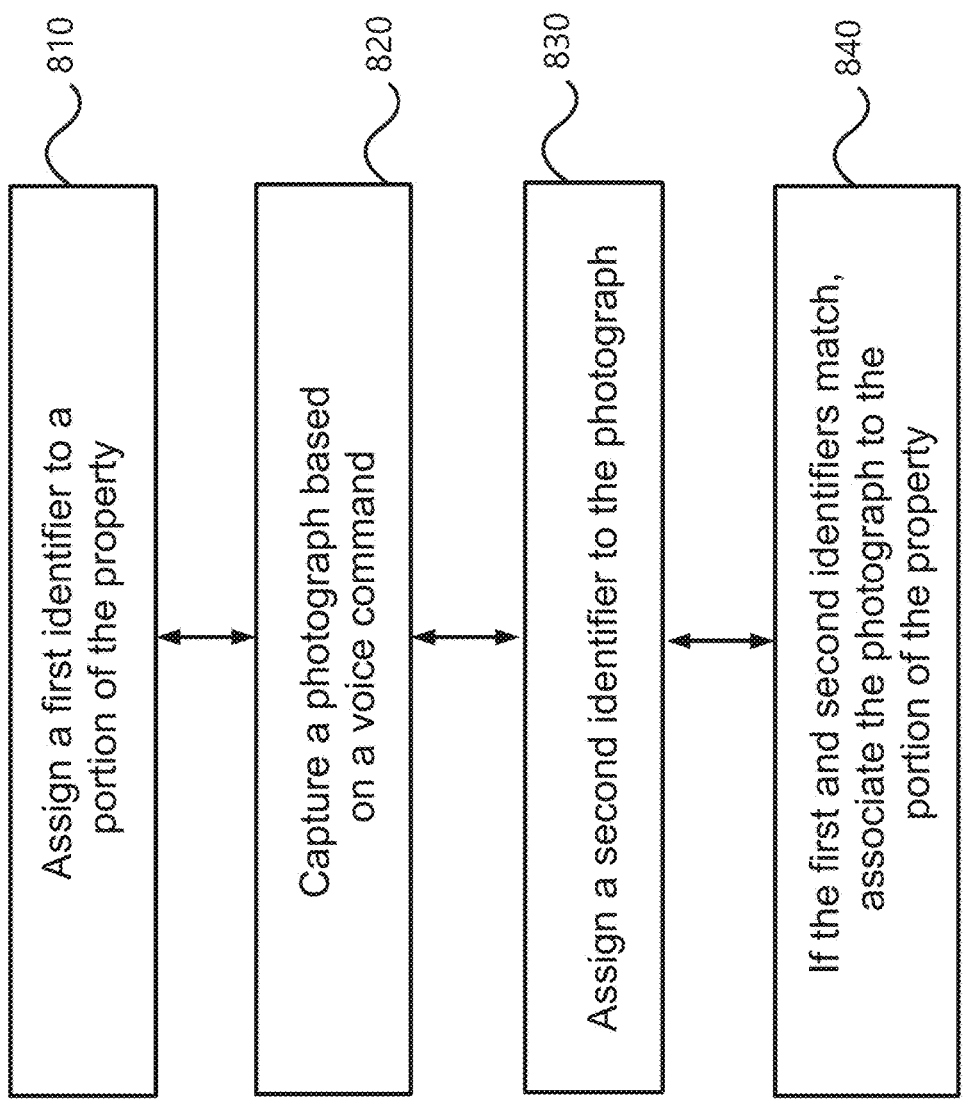
FIG. 8 is an exemplary method of associating a photograph to a portion of a property.

FIG. 8 provides a flowchart of another example method for associating a photograph to a portion of a property. Stage 810 of the method can include assigning a first identifier to a portion of the property. This can be done manually by a user or automatically. In one example, a user can assign numbers to each room of the property. In another example, the user's device can automatically assign numbers to each room of the property.

Stage 820 can include capturing a photograph based on a voice command. The voice command can be a word or phrase that instructs a device to take a photograph. The word or phrase can be customized by the user as desired.

Stage 830 can include assigning a second identifier to the photograph. In one example, the second identifier is assigned by the user. For example, the user can enter the identifier in a field associated with the photograph. The user can assign the second identifier by selecting a number, for example.

Stage 840 includes associating the photograph to a portion of the property based on the first and second identifiers matching. For example, if the user marks the photograph with the identifier "3," the system can associate the photograph with the portion of the property similarly marked with a "3." Although numbers are used for this example, any other type of identifiers can be used.

Figure 9A:
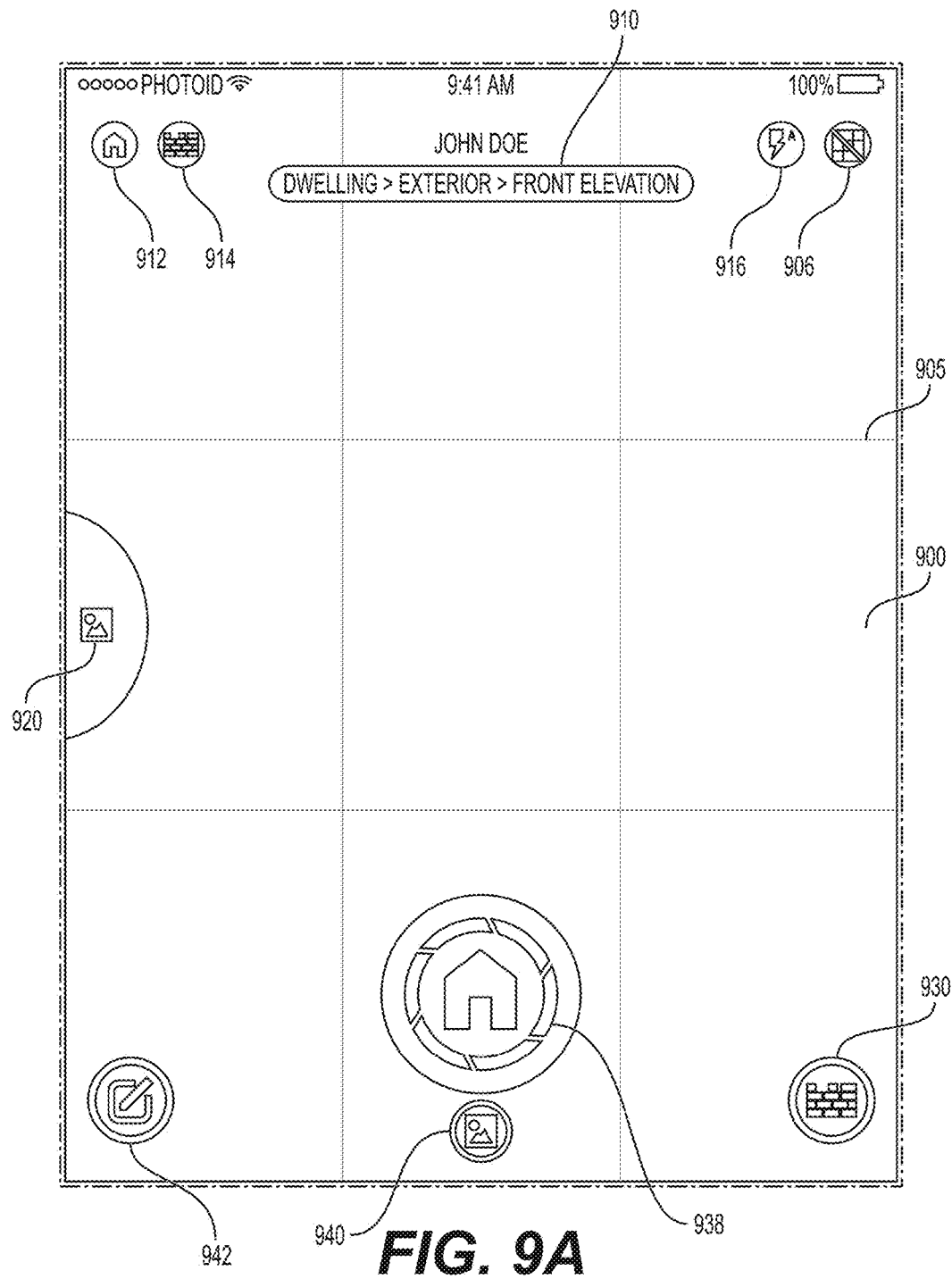
FIG. 9A is an exemplary illustration of a screen on a user device.

FIG. 9A is an example illustration of a screen 900 of a mobile device 110. The screen 900 can be a capture GUI screen that allows a user to take a picture or video associated with a property feature of a home. Region 910 can include assignment details for the home that will apply to any media the user captures. In this example, the home is identified based on its owner, John Doe. The front elevation is identified as a property feature. In one example, the user can select the property feature that will apply to future media captures. In this example, the user selected "front elevation," which was organized under the "exterior" category for dwellings.

The user can capture media by pressing the capture icon 938 of the GUI. In one example, a quick press can cause a camera to take a picture. The camera can be part of the mobile device 110 that displays the GUI in one example. In another example, the capture application on the mobile device 110 can be configured to cause a remote camera to take a picture. For example, the remote camera can be mounted on a drone, or it can be a 360 degree camera. In another example, the press can cause video to be captured. The media captured can be either a picture or video, depending on the example.

The application can also incorporate voice-to-text recognition in an example. The user might wish to label the captured media with statements such as "vandalized wall," "leak damage." In one example, if the user's press lasts longer than a threshold duration, such as half a second, the mobile device or remote microphone can record audio. The recording can last until the press is released, in an example. The user may wish to describe the media being captured. For example, the user could state "note the insect damage on the right" when capturing media of the front elevation. In one example, the audio is transcribed by the application executing on the mobile device. Either the text transcription or the audio waveform can be stored in memory in association with the media captured in response to the press. In one example, the transcribed audio can label the captured image or video.

A tag button 930 can allow the user to pre-tag whatever media the user subsequently captures. In one example, a tag can act as a title of the captured media. The tag can be written into the top of the media in one example. In another example, the tag can be stored in association with the media and retrieved with the media. This can allow the application to superimpose the tag on top of the media, such as in the foreground of the captured picture or video.

Pressing the tag button 930 can allow the user to pick from a list of common or previously entered tags. In one example, the user can also select an option to create a custom tag.

In one example, a selected tag will be applied to each subsequent media capture until the user selects a new tag or disables the tag. This can allow the user to, for example, take multiple pictures that will all be tagged the same way without the user having to make further selections of the home, property feature, or tag. This can reduce the number of selections the user needs to make in documenting a home.

In another example, the user can quickly select a new tag by swiping right or left. In one example, the swipes cause a tag to change to a new tag and display in the foreground of the screen 900.

An image import option 920 can allow a user to import images other than those captured by the camera. This can allow the user to add other images to the collection of media other than the media that is captured in real time by the user. The image import 920 can also allow the user to import documents that might be relevant to the house and property feature. The imported document, image, or other file can be stored at the server or on the mobile device in connection with the home and property feature for future retrieval. The imported image or other imported data can be displayed as selectable in a gallery of other media that relates to the same house and property feature.

A home button 912 can cause the GUI to return to an assignment screen. This can allow the user to select a new home or a new property feature.

A stamp button 914 can allow the user to toggle on and off a time and date stamp. When on, the application can store or super-impose the date and time on the captured media. Location can similarly be stored or superimposed in an example. This can help the user determine if some media is incorrectly associated with the wrong house.

The user can also toggle between flash modes by using a flash button 916. Example flash modes include forced, auto, off, or flashlight mode. This can allow a user to turn on a flashlight that remains on while media is captured.

A grid button 906 can allow the user to toggle on and off a grid 905. The grid can assist the user with lining up level and centered shots. The grid can also provide different regions for the user to describe by capturing audio with the media.

In one example, a quick edit button 942 allows a user to draw on the prior media. The annotation can be used to highlight documented damage in one example. The user can select between custom annotation markers in one example. For example, the user can use different colors to annotate different things.

Further, a gallery button 940 can allow a user to preview, rearrange, and edit individual or group images or other media. This can ensure that the user has correctly grouped the images by property feature, such as by room.

Figure 9B:
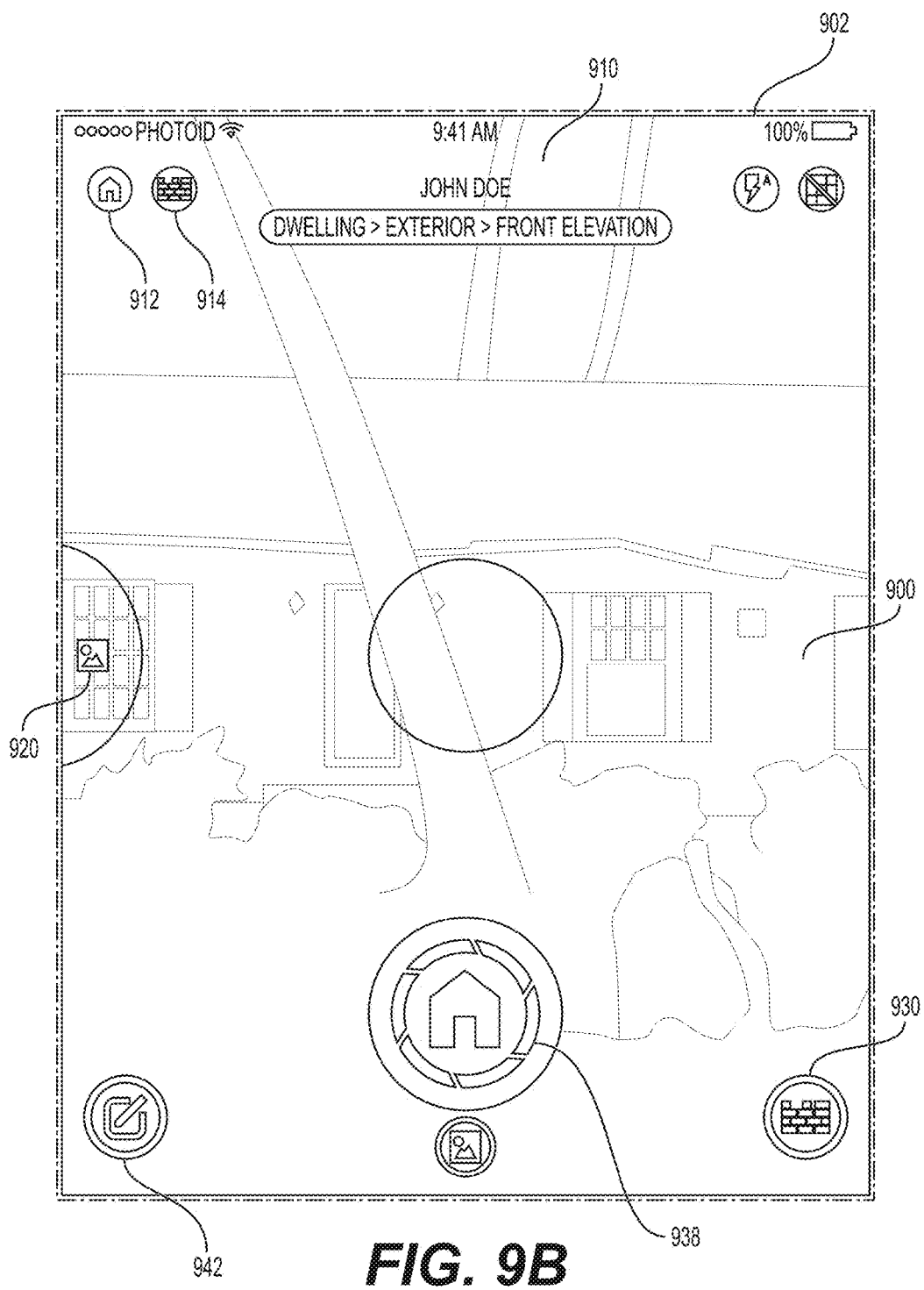
FIG. 9B is an exemplary illustration of a screen on a user device.

Turning to FIG. 9B, the same GUI screen 900 is illustrated, this time with the front elevation of the house on the screen. In this example, the user has toggled off the grid 905. The user can zoom by pinching the screen 900 in an example.

Figure 9C:
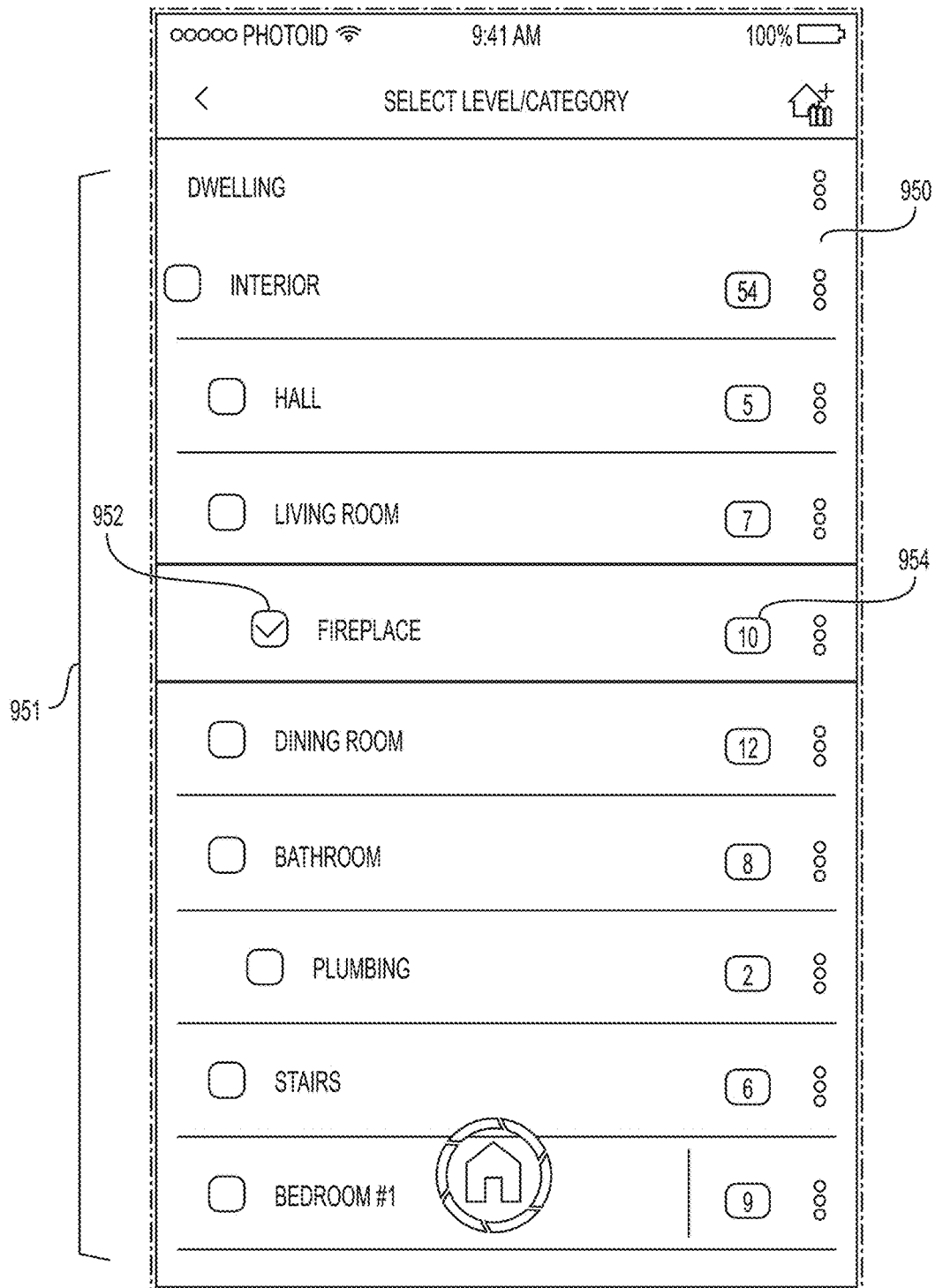
FIG. 9C is an exemplary illustration of a screen on a user device.

FIG. 9C includes an example illustration of a property feature selection screen 950. This can be part of an assignment section of the GUI, in an example. In the example of FIG. 9C, a plurality of property features 951 are displayed. The user has selected "fireplace" 952 in this example. This can set the property feature for all subsequent media capture unless and until the user makes another property feature selection in the future. The GUI can also indicate the numbers of pictures, videos, or documents (i.e., media) associated with each property feature. This can help ensure that the user has adequately documented each property feature of the home. In this example, the user has already taken 10 pictures or videos associated with the fireplace, as indicated by an icon 954.

To view the pictures for a particular property feature, the user can select the set of three dots in the same row as that property feature. This can allow the user to quickly browse back through the media they have captured.

The property features can have parents and children and display in a hierarchy. In this example, the dwelling has an interior feature. The interior feature is a parent to the hall and living room. The living room is a parent to the fireplace, which is a grandchild of interior. When the user selects to view media associated with a parent, the application can display the media of all the children of that parent in an example.

Figure 9D:
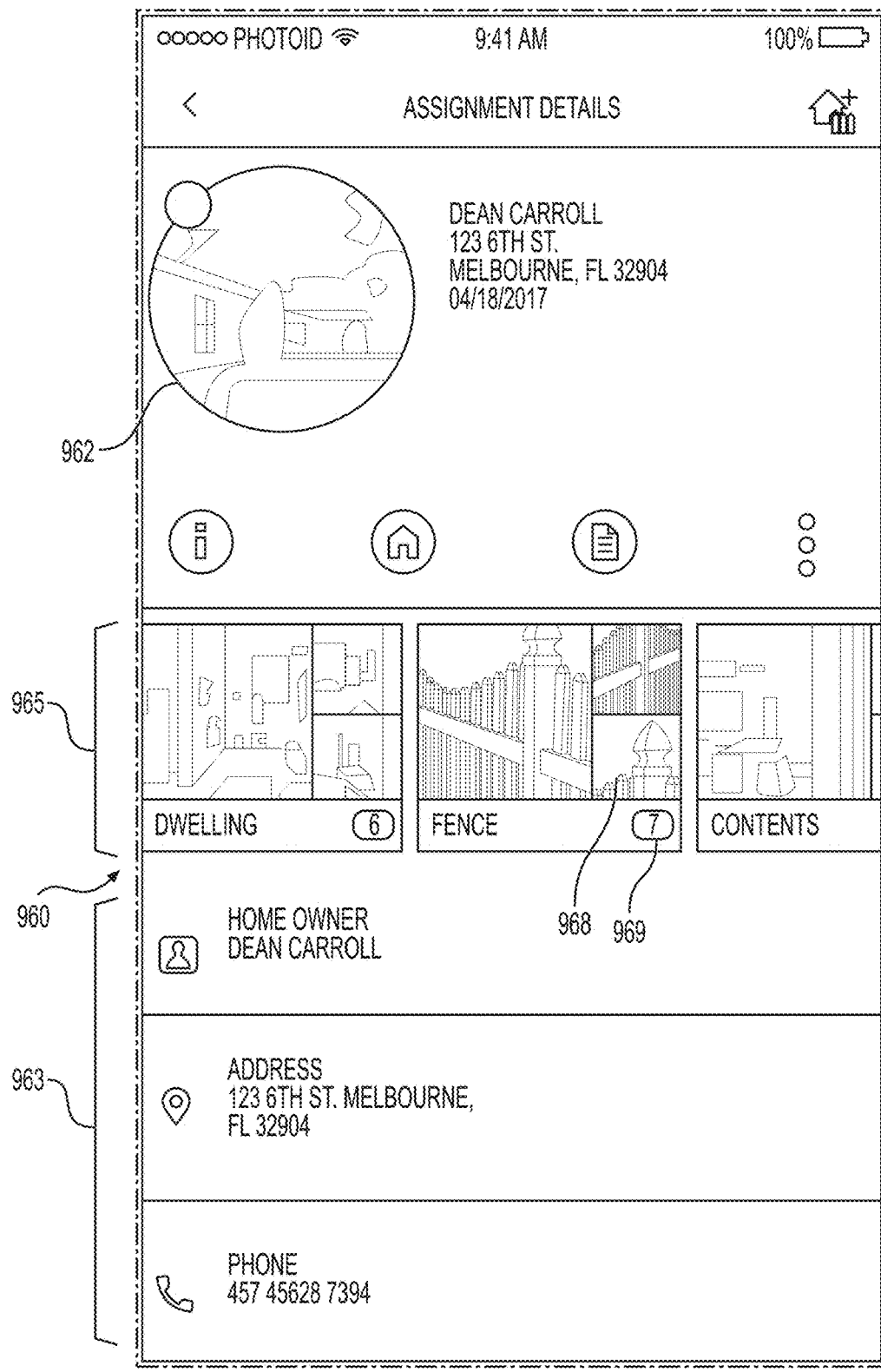
FIG. 9D is an exemplary illustration of a screen on a user device.

FIG. 9D includes an example gallery view 960. The gallery view 960 can be displayed by the GUI when the user selects the gallery button 940 of FIG. 9A in one example.

Continuing with FIG. 9D, regions 962 and 963 can identify the house. The house can be identified by the name or phone number of an owner, or by an address of the house.

A second region 965 can contain thumbnails organized by property feature. In this example, the property features "dwelling," "fence," and "contents" are in view. Each of those property features can have their own thumbnails 968 grouped together. Further, the property feature can indicate the number 969 of media items associated with the property feature.

Figure 10:
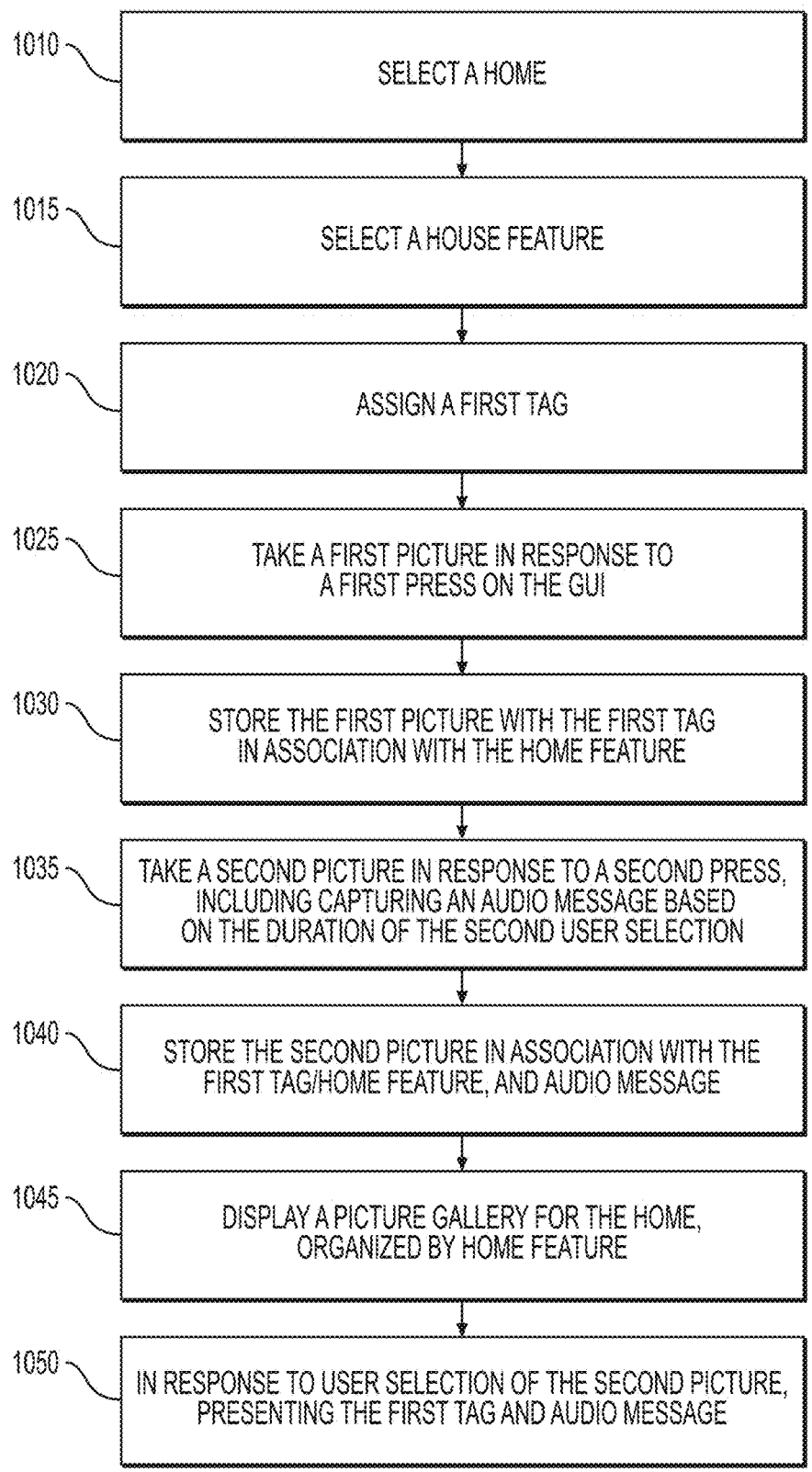
FIG. 10 is an exemplary flow chart containing steps performed by a system.

FIG. 10 includes example stages that can be performed by a system. The system can include a mobile device, such as a cell phone or tablet, that executes an application. The application can provide a GUI for capturing information used in insurance claims.

At stage 1010, the user can select a home on the GUI. This can be done based on an address or home owner name.

At stage 1015, the user can then select a property feature that the subsequent media capture will relate to. The property feature can be a room in the house, such as "kitchen," in an example. The property feature can also be a part of the room, such as "cabinets." In this way, the system can utilize parent and child property features. The root property feature can be a dwelling, with interior and exterior features having a tree structure.

At stage 1020, the user can also select a tag to assign to subsequent media capture. The tag can be a title for the media. In one example, the tag is presented in the foreground of the media during viewing or playback of the media. For example, the tag can state "water damage." The tag can be chosen from a list of stock or prior descriptions, or can be customized by the user.

At stage 1025, the user can take a first picture. This can be in response to a selection, such as a press on a picture button of the GUI. In one example, the media captured can be a video instead of a picture.

The picture or video can be taken from a camera of the mobile device 110 in an example. For example, the camera built into a cell phone can be utilized. Alternatively, the mobile device 110 can send a message to an external camera to take the picture or video. The message can be sent over a local network, such as a WIFI network, peer-to-peer such as BLUETOOTH, or over a cellular network. The external camera can be a 360 degree camera in one example. Alternatively, it can be a drone camera.

In one example, the external camera is part of smart glasses, such as GOOGLE GLASS. The application can further detect dimensions based on imagery received from the external camera. This can allow the application to approximate floorplan measurements. In one example, existing distance and measurement tools are used for the external camera. This can allow the application to superimpose distances onto first media, such as a picture. It can also allow the application to render a floorplan with measurements from each room of a house.

At stage 1030, the application can store the first picture (or other media) with the first tag in association with the property feature. The storage can occur on a cloud server backend in one example. The application can upload the picture and related identifiers for a tag or property feature when the mobile device has internet connectivity in an example. Alternatively, the storage can be handled locally on the mobile device 110.

The first picture can be stored in association such that retrieving the first picture also allows the system to retrieve the first tag. Additionally, the first picture can be associated with the property feature such that the first picture can be retrieved by identifying the property feature, or vice versa.

At stage 1035, the user can take a second picture. In so doing, the user can press down on the picture button 938 for a time period that exceeds a threshold, such as 0.5 seconds. While the press continues, the application can record audio.

At stage 1040, the second picture can be stored in association with the first tag, property feature, and audio message. The audio message can be transcribed into text for storage and retrieval purposes in one example. Because the user did not select any new tag or property feature, the second picture can be associated with the tag and property feature previously selected prior to the taking of the first picture. In this way, multiple pictures can be tagged and grouped similarly. This can allow a user, for example, to take ten pictures of a living room and similarly categorize and tag each. But the user may record different audio for particular pictures, adding additional description to those pictures.

At stage 1045, the mobile device 110 can display a picture gallery for the house. The picture gallery can be organized by property feature, for example, as show in FIG. 9D.

The user can navigate through the stored pictures based on property feature. At stage 1050, when the user selects the second picture, the mobile device 110 can present the first tag and the audio message. The audio message can be played back or presented at text, depending on the example. In one example, the picture, tag, and audio message are downloaded from a server, such as a cloud server, based on the user selection. The downloaded items are then displayed on the screen of the mobile device 110.

Figure 11:
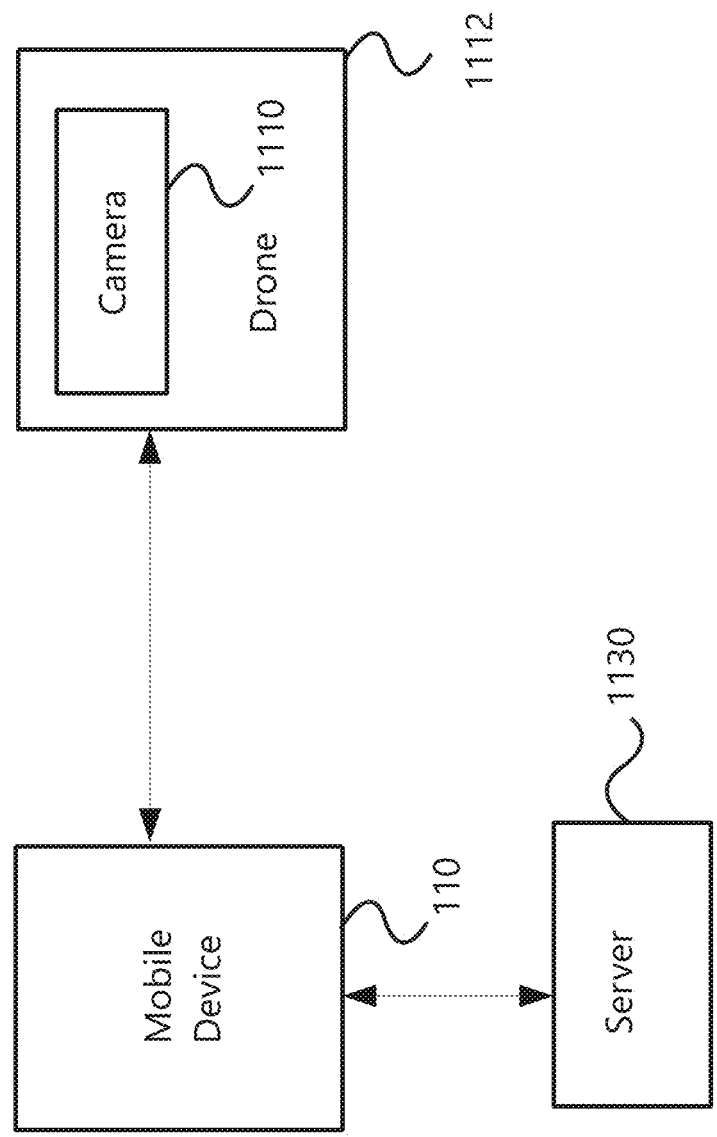
FIG. 11 is an exemplary illustration of system components.

FIG. 11 includes example system components for operating a remote camera 1110 that is part of a drone 1112. In this example, the mobile device 110 connects to the drone 1112. For example, the mobile device 110 can connect to a control of the drone 1112 or the drone 1112 itself. The connection can be over a local network, peer-to-peer, or over a cellular network.

In one example, when the user presses a button or speaks a voice command to take a picture, the application contacts the drone 1112 with a picture request. The drone 1112 can then send the picture back to the mobile device 110. The mobile device 110 can store the picture on a cloud server 1130 in an example.

Other remote cameras 1110 can be used that do not utilize a drone 1112.

Figure 12:
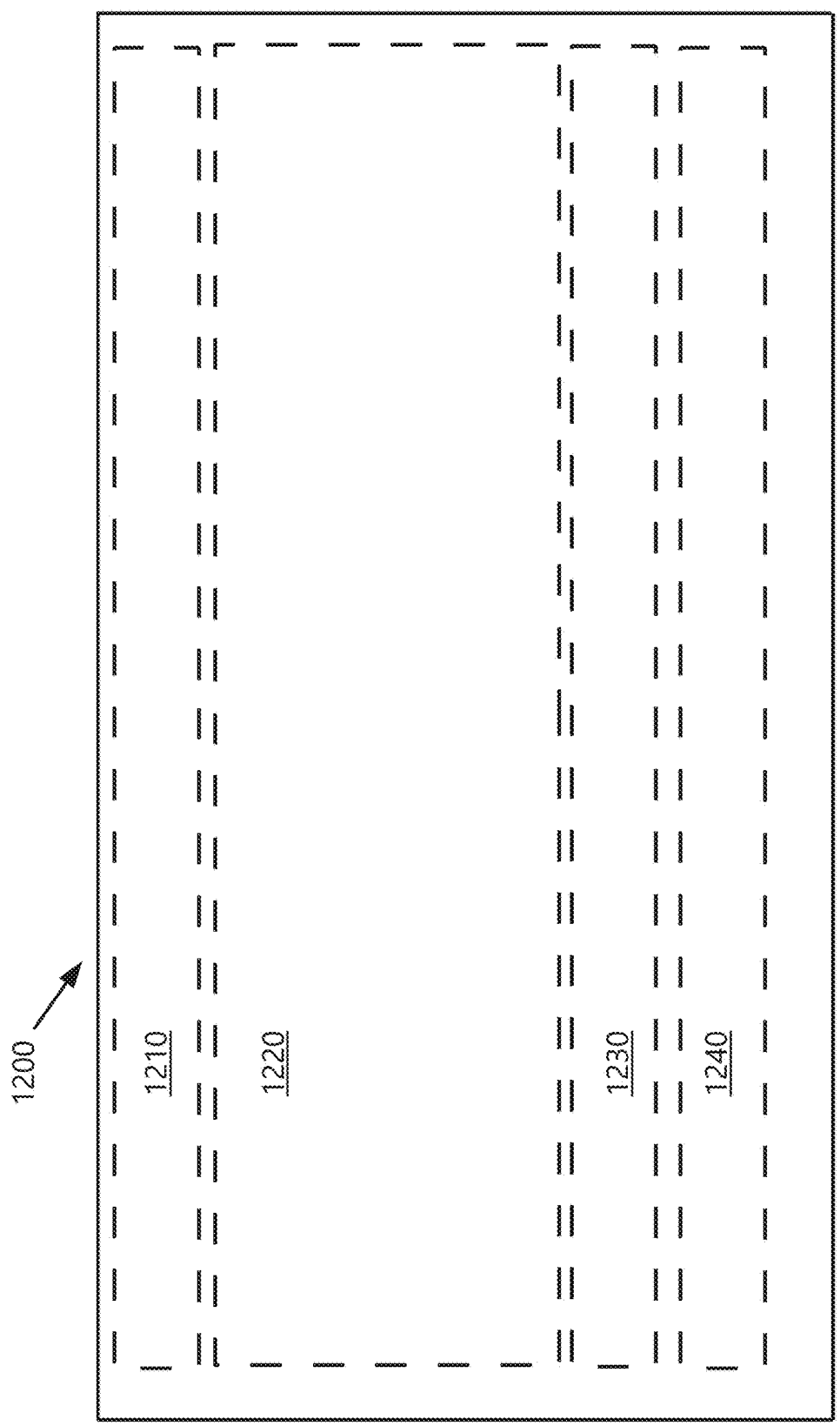
FIG. 12 is an exemplary illustration of a photo report generated by the system in an example.

FIG. 12 is an example picture report 1200 generated by the application of the mobile device 110. The picture report 1200 can allow a user to view photos of the home along with tags and transcribed audio. Photos of the same property feature can be presented sequentially in the picture report 1200.

In one example, the picture report 1200 can display home information in a first region 1210. A second region 1220 can display a picture taken with the application. A third region 1230 can display the tag that was stored in association with the picture. A fourth region 1240 can display the transcription of the recorded audio that is captured with the picture. In this way, the picture, tag, and recorded audio can all be presented together in the picture report 1200. Each subsequent picture can also be displayed with its respective associated tag and audio, in an example.

The system can generate the picture report 1200 based on stored pictures, tags, and transcribed audio notes in an example. The server 1130 can generate the report in one example based on the files stored in the cloud. Alternatively, the application on the mobile device 110 can generate the picture report 1200.

It is to be understood that both the foregoing general description and the following detailed description are exemplary and explanatory only and are not restrictive of the examples, as claimed.

Other examples of the invention will be apparent to those skilled in the art from consideration of the specification and practice of the invention disclosed herein. The terms "appraiser," "inspector," "adjuster," "estimation," and "adjustment" are not meant to limit the examples and are exemplary only. Other types of users can use the systems described herein. The example systems can apply to contexts other than insurance adjustment. It is intended that the specification and examples be considered as exemplary only, with a true scope and spirit of the invention being indicated by the following claims.

What is claimed is:

1. A non-transitory, computer-readable medium containing instructions that, when executed by a processor of a computing device, cause the computing device to perform stages for home insurance adjustment, the stages comprising:

receiving, on a graphical user interface ("GUI"), a first selection of a house from a plurality of houses;

receiving, on the GUI, a second selection of a property feature of the house;

based on a first press on the GUI, causing a camera to capture first media that is a picture or video and a first audio, the first audio being captured based on the first press lasting past a threshold time period;

transcribing the first audio into first text;

storing the first media and first text in association with the house and property feature;

causing the camera to capture a second media based on a second press; and without receiving further selections of the previously-selected property feature, storing the second media in association with the home and property feature;

sorting a collection of media in a gallery view that groups the first and second media together based on house and property feature, wherein selection of the first media causes the first text to be displayed with the first media;

displaying, in the gallery view, a number of pictures per at least two different property features, along with a clickable phone number associated with an owner of the house; and generating a report that displays the first and second media simultaneously for the property feature.

2. The non-transitory, computer-readable medium of claim 1, wherein the camera is mounted on a drone.

3. The non-transitory, computer-readable medium of claim 1, the stages further comprising:

storing the first audio in association with the first media, wherein selection of the first media causes the first audio to play.

4. The non-transitory, computer-readable medium of claim 1, wherein the gallery view displays media gallery thumbnails that are grouped by property feature.

5. The non-transitory, computer-readable medium of claim 1, the stages further comprising:

recording second audio with the second media based on the second press exceeding a threshold time period;

storing the second audio in association with the second media;

displaying a media gallery based on user selection of the house and property feature, the media gallery including both the first media and second media; and in response to selection of the second media, presenting the second media with the second audio.

6. The non-transitory, computer-readable medium of claim 1, the stages further comprising:

receiving annotations on the first media;

storing the annotations in association with the first media; and in response to selection of the first media, displaying the annotations and tag with the first media.

7. A mobile device including a processor that executes an application for capturing insurance adjustment information, the processor performing stages comprising:

receiving, on a graphical user interface ("GUI"), a first selection of a house from a plurality of houses;

receiving, on the GUI, a second selection of a property feature of the house;

based on a first press on the GUI, causing a camera to capture first media that is a picture or video and a first audio, the first audio being captured based on the first press lasting past a threshold time period;

transcribing the first audio into first text;

storing the first media and first text in association with the house and property feature;

causing the camera to capture a second media based on a second press;

without receiving further selections of the previously-selected property feature, storing the second media in association with the home and property feature;

sorting a collection of media in a gallery view that groups the first and second media together based on house and property feature, wherein selection of the first media causes the first text to be displayed with the first media; and displaying, in the gallery view, a number of pictures per at least two different property features, along with a clickable phone number associated with an owner of the house.

8. The mobile device of claim 7, wherein the camera is mounted on a drone that is separate from the mobile device.

9. The mobile device of claim 7, the stages further comprising:

storing the first audio in association with the first media, wherein selection of the first media causes the first audio to play.

10. The mobile device of claim 7, wherein the gallery view displays media gallery thumbnails that are grouped by property feature.

11. The mobile device of claim 7, the stages further comprising:

recording second audio with the second media based on the second press exceeding a threshold time period;

storing the second audio in association with the second media;

displaying a media gallery based on user selection of the house and property feature, the media gallery including both the first media and second media; and in response to selection of the second media, presenting the second media with the second audio.

12. The mobile device of claim 7, the stages further comprising:

receiving annotations on the first media;

storing the annotations in association with the first media; and in response to selection of the first media, displaying the annotations and tag with the first media.

13. A computer-implemented method, comprising:

receiving, on a graphical user interface ("GUI"), a first selection of a house from a plurality of houses;

receiving, on the GUI, a second selection of a property feature of the house;

based on a first press on the GUI, causing a camera to capture first media that is a picture or video and a first audio, the first audio being captured based on the first press lasting past a threshold time period;

transcribing the first audio into first text;

storing the first media and first text in association with the house and property feature;

causing the camera to capture a second media based on a second press;

without receiving further selections of the previously-selected property feature, storing the second media in association with the home and property feature;

sorting a collection of media in a gallery view that groups the first and second media together based on house and property feature, wherein selection of the first media causes the first text to be displayed with the first media; and displaying, in the gallery view, a number of pictures per at least two different property features, along with a clickable phone number associated with an owner of the house.

14. The method of claim 13, wherein the camera is mounted on a drone that is separate from a mobile device that displays the GUI.

15. The method of claim 13, further comprising:

storing the first audio in association with the first media, wherein selection of the first media causes the first audio to play.

16. The method of claim 13, further comprising displaying media gallery thumbnails in the gallery view that are grouped by property feature.

17. The method of claim 13, further comprising:

recording second audio with the second media based on the second press exceeding a threshold time period;

storing the second audio in association with the second media;

displaying a media gallery based on user selection of the house and property feature, the media gallery including both the first media and second media; and in response to selection of the second media, presenting the second media with the second audio.

\* \* \* \* \*